United States Patent
Bamba

(10) Patent No.: US 12,505,640 B2
(45) Date of Patent: Dec. 23, 2025

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Yasuo Bamba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 18/065,134

(22) Filed: Dec. 13, 2022

(65) Prior Publication Data

US 2023/0196714 A1 Jun. 22, 2023

(30) Foreign Application Priority Data

Dec. 21, 2021 (JP) .................... 2021-207286

(51) Int. Cl.
| | |
|---|---|
| G06K 9/00 | (2022.01) |
| G06T 7/11 | (2017.01) |
| G06V 10/44 | (2022.01) |
| G06V 40/16 | (2022.01) |
| H04L 9/32 | (2006.01) |

(52) U.S. Cl.
CPC ............ *G06V 10/44* (2022.01); *G06T 7/11* (2017.01); *G06V 40/171* (2022.01); *H04L 9/3213* (2013.01); G06T 2207/30201 (2013.01)

(58) Field of Classification Search
CPC ...... G06V 10/44; G06V 40/171; G06V 10/32; G06V 10/454; G06V 10/82; G06V 40/175; G06T 7/11; G06T 2207/30201
See application file for complete search history.

(56) References Cited

U.S. PATENT DOCUMENTS

2019/0188882 A1* 6/2019 Son ................... G06N 3/047
2020/0272806 A1* 8/2020 Walker ............... G06V 40/167
(Continued)

FOREIGN PATENT DOCUMENTS

WO    WO-2017210462 A1 * 12/2017 ............... G06N 3/08

OTHER PUBLICATIONS

Tokens-to-Token ViT: Training Vision Transformers from Scratch on ImageNet, Li Yuan et al., arXiv, Nov. 2021, pp. 1-10 (Year: 2021).*

(Continued)

*Primary Examiner* — Jayesh A Patel
(74) *Attorney, Agent, or Firm* — Canon U.S.A., Inc., IP Division

(57) ABSTRACT

An image processing apparatus includes an obtaining unit, a division unit, a conversion unit, an addition unit, an encoding unit, an extraction unit, and a determination unit. The obtaining unit obtains an image including an object. The division unit divides the obtained image into a plurality of partial images. The conversion unit converts the plurality of partial images into tokens being vectors having a fixed dimension. The addition unit adds a class token, which has the fixed dimension corresponding to the tokens, to a sequence of the tokens. The encoding unit updates the sequence of tokens to which the class token is added based on relevance between the tokens. The extraction unit extracts a feature amount of the object using the updated class token. The determination unit determines an attribute of the object using the updated class token.

15 Claims, 15 Drawing Sheets

(56) References Cited

U.S. PATENT DOCUMENTS

| | | | |
|---|---|---|---|
| 2022/0036564 A1* | 2/2022 | Ye | G06T 7/11 |
| 2022/0122351 A1* | 4/2022 | Chen | G06V 20/41 |
| 2023/0077498 A1* | 3/2023 | Kimura | G06V 10/82 |
| | | | 382/157 |

OTHER PUBLICATIONS

Face Transformer for Recognition, Yaoyao Zhong et al., arXiv, Apr. 2021, pp. 1-5 (Year: 2021).*

On the Effectiveness of Vision Transformers for Zero-shot Face Anti-Spoofing, Anjith George et al., IEEE, 2021, pp. 1-8 (Year: 2021).*

Image classification for Soyabean and weeds based on VIT, Jigxin Liang et al., MMSE, 2021, pp. 1-7 (Year: 2021).*

End-to-End object detection with Transformers, Nicolas Carlon et al., arXiv, 2020, pp. 1-26 (Year: 2020).*

Visual Transformers: Token-based Image Representation and Processing for Computer Vision, Bichen Wu et al., arXiv, Nov. 2020, pp. 1-12 (Year: 2020).*

An Image is Worth 16X16 Words:Transformers for Image Recognition at Scale, Alexey Dosovitskiy et al., arXiv, Jun. 2021, pp. 1-22 (Year: 2021).*

Zhong, Y., et al., "Face Transformer for Recognition", pp. 1-5.

Dosovitskiy, A., et al., "An Image is Worth 16X16 Words: Transformers for Image Recognition at Scale", ICLR 2021.

Wang, Z., et al., "Multi-task Deep Neural Network for Joint Face Recognition and Facial Attribute Prediction", ICMR, Jun. 6-9, 2017, pp. 365-374.

* cited by examiner

IMAGE PROCESSING APPARATUS, METHOD FOR CONTROLLING THE SAME, AND STORAGE MEDIUM

BACKGROUND

Field

The present disclosure relates particularly to an image processing apparatus that performs multitask learning in machine learning.

Description of the Related Art

Many feature extraction techniques for extracting useful information through sophisticated processing on images of objects in captured images have been discussed in recent years. In particular, a lot of feature extraction techniques related to feature extractors that extract a feature vector of an object in an image using a multilayer neural network called a deep network (also referred to as a deep neural network or deep learning) have been discussed.

Such a feature extractor is learned by a technique called metric learning, for example. Metric learning initially defines a distance between feature vectors. Examples of the definition of the distance include the Euclidean distance and cosine similarity. In metric learning, the feature extractor is learned so as to output feature vectors at a small distance for images containing the same object or objects belonging to the same class, and output feature vectors at a large distance for images containing different objects or objects belonging to different classes. Vehicle identity determination and face recognition are known as application examples of metric learning. In particular, a technique for achieving face recognition using metric learning is discussed in Deng, Jiankang, et al., "Arcface: Additive angular margin loss for deep face recognition", Proceedings of the IEEE Conference on Computer Vision and Pattern Recognition, 2019.

Meanwhile, in machine learning, a technique for learning two or more related tasks at the same time, which is called multitask learning, is known. In multitask learning, one model learns one main task and one or more sub tasks so that the model can solve the tasks at the same time, whereby the prediction performance of the main task is often improved. Wang, Zhanxiong, et al., "Multi-task deep neural network for joint face recognition and facial attribute prediction", Proceedings of the 2017 ACM on International Conference on Multimedia Retrieval, 2017, discusses a neural network-based technique where the accuracy of a face recognition task that is the main task is improved by learning the face recognition task and a face attribute determination task at the same time.

Feature extractors using a transformer model that provide accuracy equal to or higher than that of feature extractors using a convolutional neural network have started to be used rapidly in recent years. However, a method for improving feature extraction performance by introducing a multitask learning framework into face recognition using a transformer model has not been sufficiently studied so far.

SUMMARY

The present disclosure is directed to a technique that improves feature extraction performance of a transformer model-based feature extractor by using multitask learning.

According to an aspect of the present disclosure, an image processing apparatus configured to perform multitask learning to learn a main task of extracting a feature amount of an object and a sub task of determining an attribute of the object includes at least one memory storing instructions, and at least one processor that, upon execution of the stored instructions, is configured to operate as an obtaining unit configured to obtain an image including the object, a division unit configured to divide the obtained image into a plurality of partial images, a conversion unit configured to convert the plurality of partial images into tokens, the tokens being vectors having a fixed dimension, an addition unit configured to add a class token to a sequence of the tokens, the class token having the fixed dimension corresponding to the tokens, an encoding unit configured to update the sequence of the tokens to which the class token is added based on relevance between the tokens, an extraction unit configured to extract the feature amount of the object using the updated class token, and a determination unit configured to determine the attribute of the object using the updated class token.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings. Configurations described in the following exemplary embodiments are merely examples, and the present disclosure is not limited to the illustrated configurations. The following description will be given using a feature extractor that extracts a feature vector for determining the identity of a human face from an input image containing the human face (hereinafter referred to as a face image) as an example. However, the target for which a feature vector is extracted is not limited to a face, and may be any object whose identity can be determined using a feature vector. In the following exemplary embodiments, examples where multitask learning is performed to learn a feature amount extraction task as a main task and a face attribute determination task as a sub task will be described.

Figure 1:
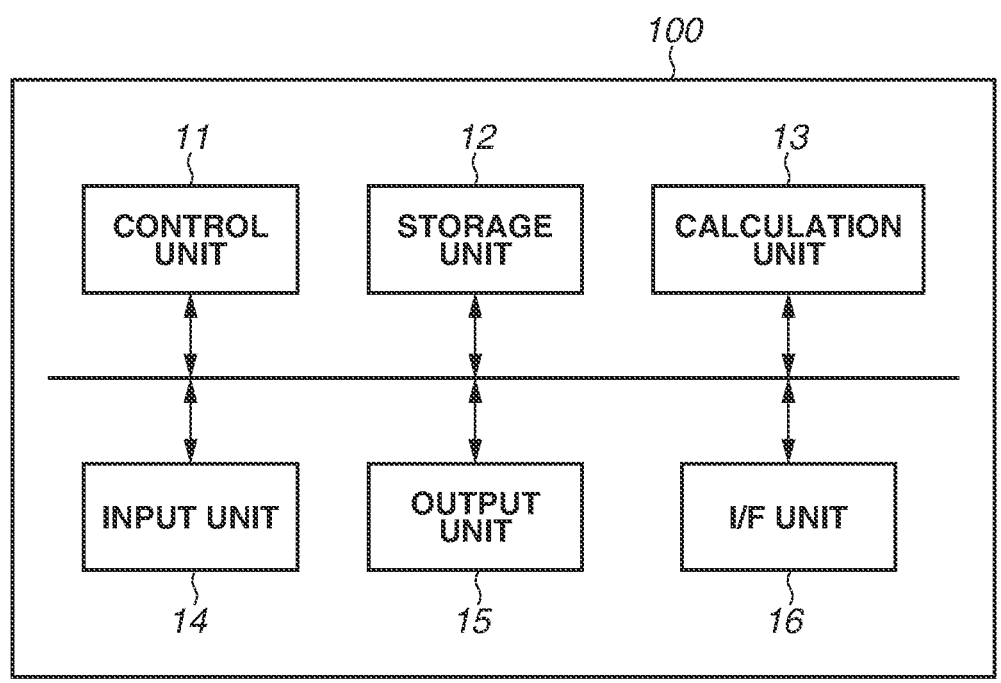
FIG. 1 is a block diagram illustrating a hardware configuration example of an image processing apparatus according to a first exemplary embodiment.

FIG. 1 is a block diagram illustrating a hardware configuration example of an image processing apparatus 100 according to a first exemplary embodiment. The image processing apparatus 100 includes a control unit 11, a storage unit 12, a calculation unit 13, an input unit 14, an output unit 15, and an interface (I/F) unit 16 as hardware components.

The control unit 11 controls the entire image processing apparatus 100. The storage unit 12 stores programs and data for the control unit 11 to operate. The calculation unit 13 performs predetermined calculation processing under control by the control unit 11. The input unit 14 is a human interface device and inputs user's operations to the image processing apparatus 100. The output unit 15 is a display and presents a processing result of the image processing apparatus 100 to the user.

The I/F unit 16 is a wired I/F for a Universal Serial Bus, a local area network, or an optical cable, or a wireless I/F for Wi-Fi® or Bluetooth®. The I/F unit 16 connects to a camera and inputs captured images to the image processing apparatus 100, and also transmits a processing result obtained by the image processing apparatus 100 to an external apparatus.

The I/F unit 16 further inputs programs and various types of data for the image processing apparatus 100 to operate, to the image processing apparatus 100 as appropriate.

Figure 2:
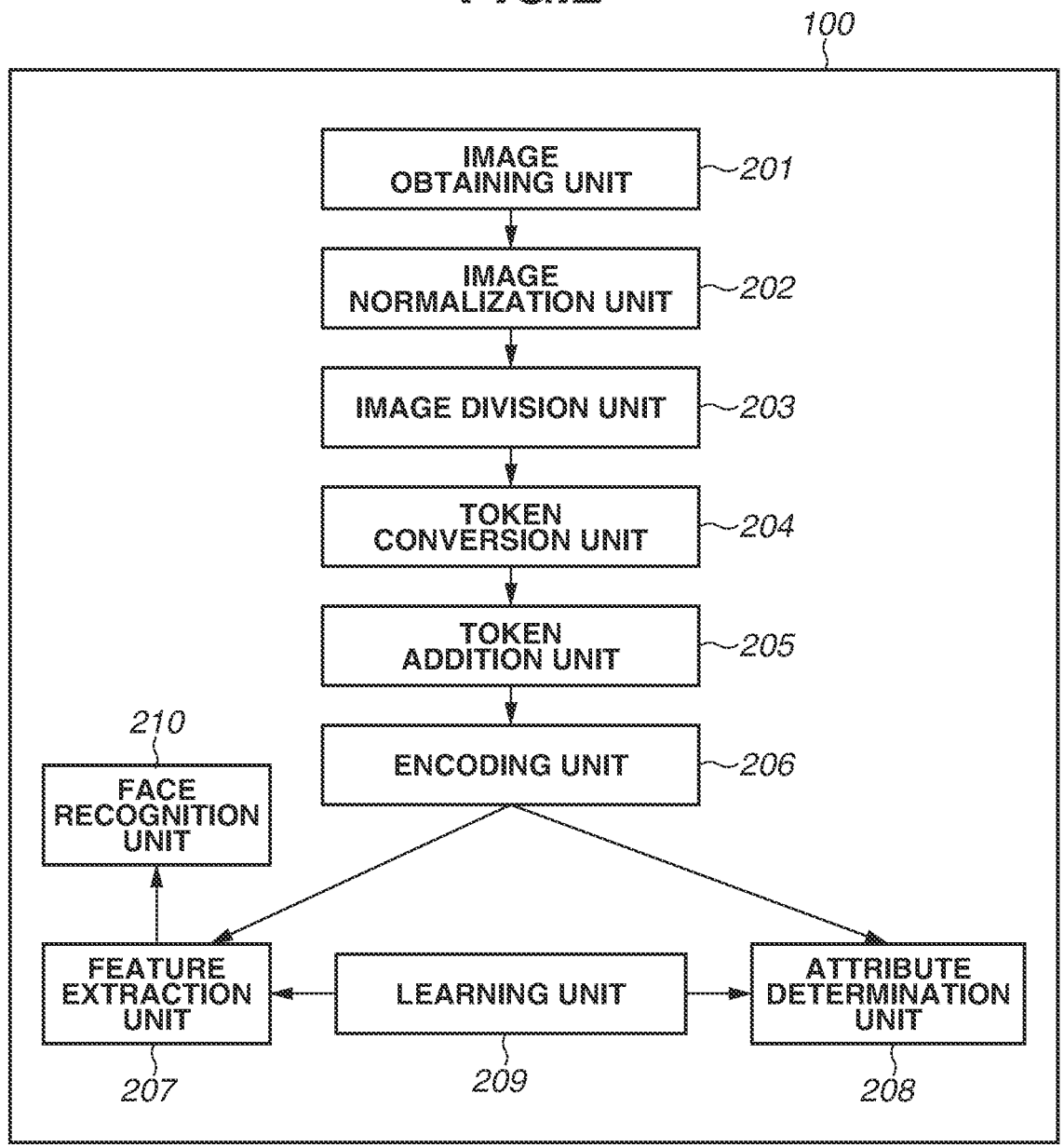
FIG. 2 is a block diagram illustrating a functional configuration example of the image processing apparatus according to the first exemplary embodiment.

FIG. 2 is a block diagram illustrating a functional configuration example of the image processing apparatus 100 according to the present exemplary embodiment.

The image processing apparatus 100 includes an image obtaining unit 201, an image normalization unit 202, an image division unit 203, a token conversion unit 204, a token addition unit 205, an encoding unit 206, a feature extraction unit 207, an attribute determination unit 208, a learning unit 209, and a face recognition unit 210 as functional components. Details of the learning unit 209 will be described below.

The image obtaining unit 201 obtains a face image. The face image to be obtained by the image obtaining unit 201 may be an image stored in the storage unit 12 or a captured image received by the I/F unit 16 via a network such as the Internet.

The image normalization unit 202 obtains a normalized face image by applying normalization processing to the face image obtained by the image obtaining unit 201. The normalized face image is an image extracted to have a predetermined number of pixels both in height and width, without the face being laterally tilted and with a substantially constant face size and a substantially constant face position relative to the normalized face image. The normalization processing is intended to reduce variations in the in-plane rotation angle and size of the face in the face image.

The image division unit 203 divides the normalized face image obtained by the image normalization unit 202 into partial images each having a predetermined number of pixels both in height and width to obtain a partial image sequence. The token conversion unit 204 converts the partial image sequence obtained by the image division unit 203 into a token sequence. As employed herein, the term "token" refers to a vector having a fixed dimension (hereinafter denoted by D). A partial image is converted into a token by flattening the partial image into a vector and further applying a linear transformation to convert the number of dimensions of the vector into D. The linear transformation is not limited to processing for multiplying the input by a weight matrix but may include processing for multiplying the input by a weight matrix and then adding a bias vector thereto.

The token addition unit 205 adds a D-dimensional token called a class token to the token sequence obtained by the token conversion unit 204. The encoding unit 206 performs encoding processing for token sequence update, on the token sequence obtained by the token addition unit 205 once or more. Details of the encoding processing will be described below. The token sequence finally obtained by the encoding unit 206 is referred to as an encoded expression sequence.

The feature extraction unit 207 obtains a feature vector for determining the identity of the face in the face image, using an encoded expression corresponding to the class token in the encoded expression sequence obtained by the encoding unit 206. The feature vector obtained by the feature extraction unit 207 is a feature amount used by the face recognition unit 210 to determine whether objects included in two images are the same as each other, for example. The face recognition unit 210 determines that objects (persons) included in two images are the same as each other if a distance between the feature amounts extracted from the two images is less than a predetermined value. The face recognition unit 210 determines that the objects are different from each other if the distance between the feature amounts is greater than or equal to the predetermined value. The attribute determination unit 208 determines attributes of the face in the face image, using the encoded expression corresponding to the class token in the encoded expression sequence obtained by the encoding unit 206.

Figure 7:
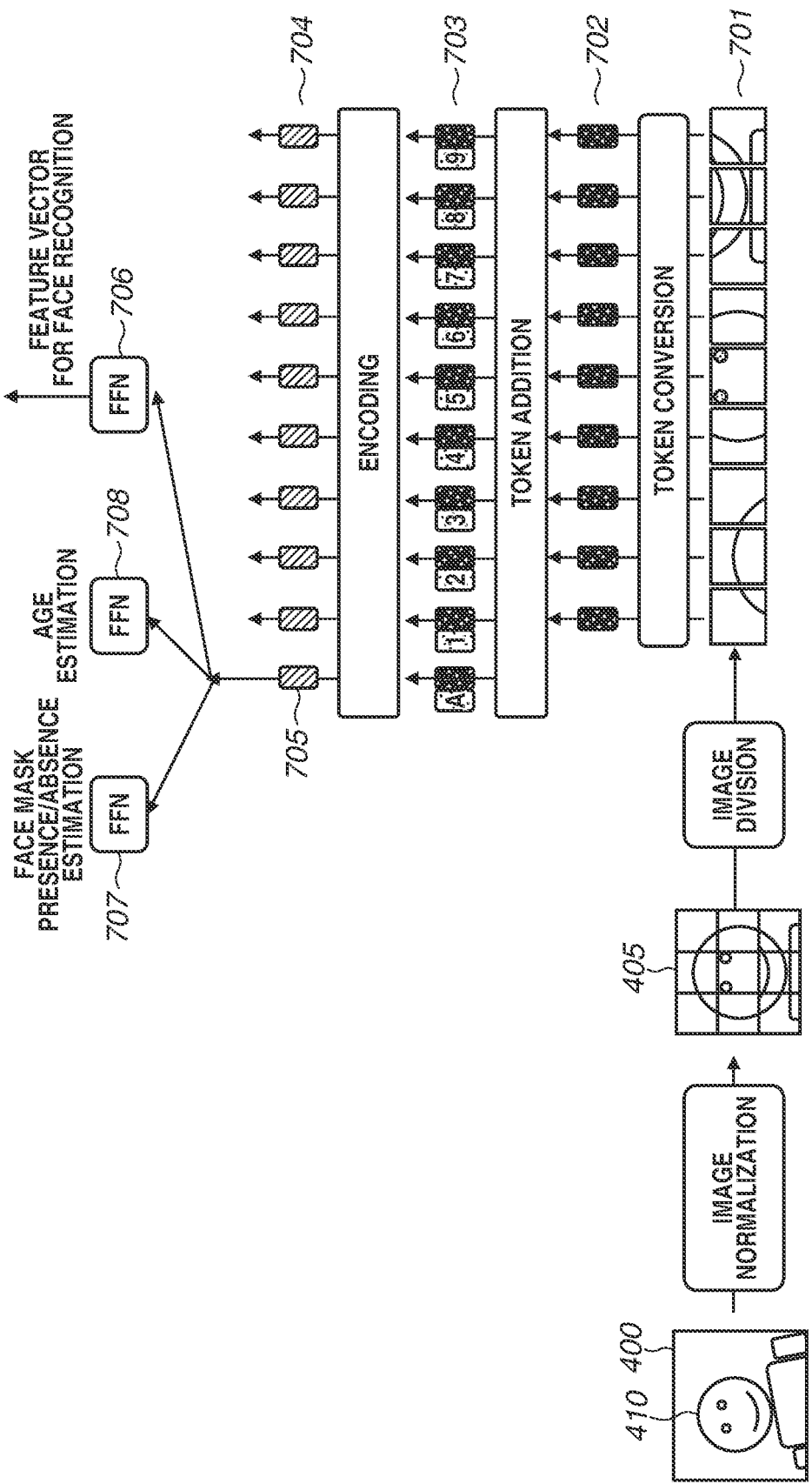
FIG. 7 is a schematic diagram illustrating the inference processing according to the first exemplary embodiment.

Next, an example of an inference processing procedure by the image processing apparatus 100 according to the present exemplary embodiment will be described with reference to a flowchart of FIG. 3 and a schematic diagram of FIG. 7.

In step S301, the image obtaining unit 201 obtains a face image 400. For ease of description, the face image 400 is assumed to contain one face 410 as illustrated in FIG. 7.

Figure 4:
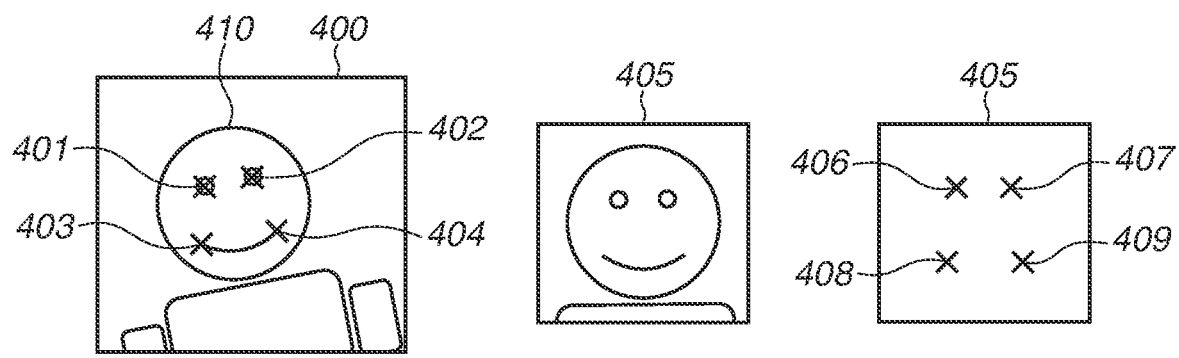
FIG. 4 is a diagram illustrating an example of normalization processing on a face image.

In step S302, the image normalization unit 202 obtains a normalized face image 405 by applying the normalization processing to the face image 400 obtained by the image obtaining unit 201. An example of the normalization processing on the face image 400 will now be described with reference to FIG. 4. The face image 400 includes the face 410. In the normalization processing, the positions of organ points such as the eyes, nose, and mouth of the face 410 in the face image 400 are estimated using a known organ point position estimation technique. In the example of FIG. 4, the positions of a right eye center 401, a left eye center 402, a right mouth end 403, and a left mouth end 404 are estimated. Next, the image normalization unit 202 extracts the normalized face image 405 from the face image 400 based on the estimated positions of the organ points. For example, the normalized face image 405 is extracted by applying a geometric transformation such as an affine transformation to the face image 400 so that the right eye center 401, the left eye center 402, the right mouth end 403, and the left mouth end 404 are located near predetermined positions 406, 407, 408, and 409 of the normalized face image 405, respectively.

In step S303, the image division unit 203 divides the normalized face image 405 obtained by the image normalization unit 202 into partial images each having a predetermined number of pixels both in height and width to obtain a partial image sequence 701. At this time, the image division unit 203 divides the normalized face image 405 so that each pixel in the normalized face image 405 belongs to one partial image, i.e., there is neither a gap nor an overlap between partial images. In the following description, it is assumed that the normalized face image 405 has a height of H pixels and a width of W pixels, and the partial images each have a height of $P_H$ pixels and a width of $P_W$ pixels, with the number of channels C. It is also assumed that H is divisible by $P_H$, and W by $P_W$. Thus, a length N of the partial image sequence 701 is $(H/P_H) \times (W/P_W)$. In the example of FIG. 7, the length N of the partial image sequence 701 is 9. However, the division of the normalized face image 405 into partial images is not limited to the foregoing. As discussed in Thong, Yaoyao, and Weihong Deng, "Face Transformer for Recognition", arXiv preprint arXiv:2103.14803 (2021), the normalized face image 405 may be divided into partial images that overlap each other by a predetermined number of pixels.

In step S304, the token conversion unit 204 converts the partial image sequence 701 obtained by the image division unit 203 into a token sequence 702. An example of conversion processing from a partial image into a token will now be described. The partial image is initially flattened into a $P_H P_W C$-dimensional vector. A linear transformation is then applied to this vector to obtain a D-dimensional vector (token). As will be described below, the parameters of the linear transformation are learned by the learning unit 209.

In step S305, the token addition unit 205 adds a D-dimensional token called a class token to the token sequence 702 obtained by the token conversion unit 204 to obtain a new token sequence 703. The length of the token sequence 703 obtained by this processing is N+1 (=N'). The parameters of the class token are also learned by the learning unit 209. In the example of FIG. 7, the token located at the left end of the token sequence 703 is the class token.

The token addition unit 205 may further add a D-dimensional vector called a position encoding vector (a position embedding vector) to each of the N' tokens. The position encoding vectors have different values for different positions in the token sequence 703, and contain information about which positions in the normalized face image 405 the respective tokens correspond to. The position encoding vectors may be artificially designed or learned by the learning unit 209 in advance.

In step S306, the encoding unit 206 performs encoding processing on the token sequence 703 obtained by the token addition unit 205 once or more. As employed herein, the term "encoding processing" refers to processing for updating each of the tokens based on relevance between the tokens included in the token sequence 703.

For example, a method using a transformer encoder discussed in Dosovitskiy, Alexey, et al., "An image is worth 16×16 words: Transformers for image recognition at scale", arXiv preprint arXiv:2010.11929 (2020) is employed for the encoding processing.

A method for performing the encoding processing using a transformer encoder will now be described.

Figure 5:
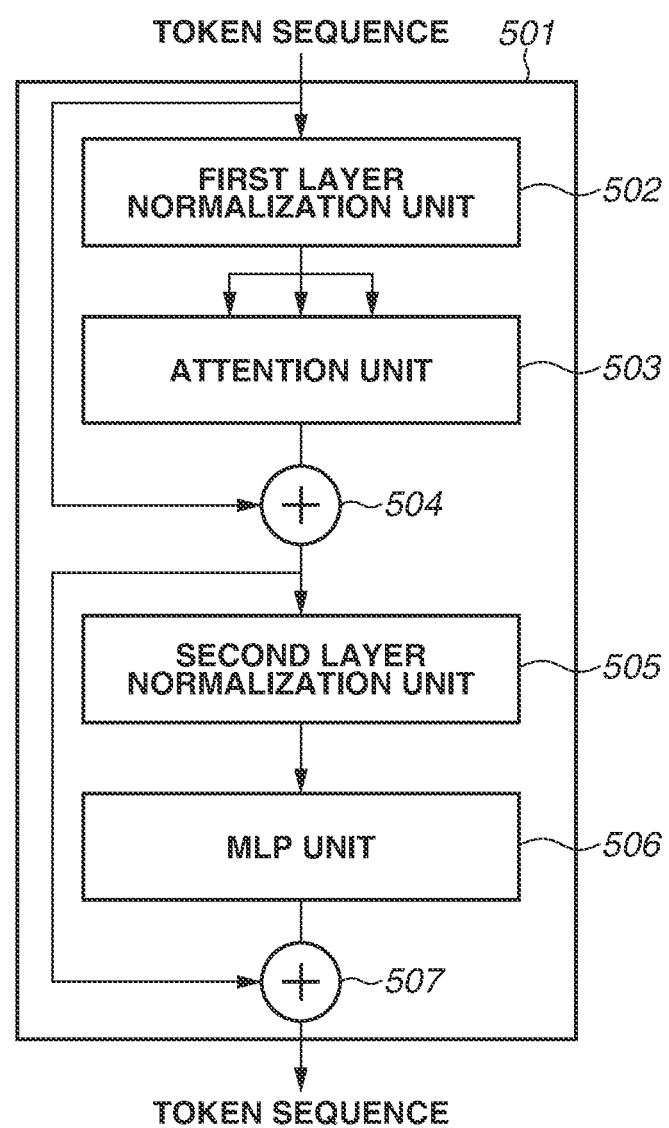
FIG. 5 is a block diagram illustrating an example of a configuration where a transformer encoder performs a single round of encoding processing.

FIG. 5 is a block diagram illustrating an example of a configuration where a transformer encoder 501 performs a single round of encoding processing. The transformer encoder 501 is configured to input a token sequence and output a token sequence. The transformer encoder 501 includes a first layer normalization unit 502, an attention unit 503, and a first skip connection unit 504. The transformer encoder 501 further includes a second layer normalization unit 505, a multilayer perceptron (MLP) unit 506, and a second skip connection unit 507.

A token sequence is initially input to the first layer normalization unit 502. The first layer normalization unit 502 applies normalization called layer normalization to the token sequence, whereby each of the tokens is independently normalized. Parameters to be used in the layer normalization are learned by the learning unit 209 as will be described below.

The token sequence normalized by the first layer normalization unit 502 is updated by the attention unit 503. The attention unit 503 includes M attention mechanisms (M is an integer greater than or equal to 1). If M>1, the M attention mechanisms acquire respective different parameter weights through learning by the learning unit 209 and can discover relevance between the tokens from a plurality of aspects.

A method for updating the token sequence using one of the M attention mechanisms will now be described. The token sequence is expressed by an N'×D matrix. This matrix is multiplied by weight matrices $U_Q$, $U_K$, and $U_V$ acquired in advance through learning by the learning unit 209 to obtain a query matrix Q, a key matrix K, and a value matrix V. The weight matrices $U_Q$, $U_K$, and $U_V$ each have a size of $D \times D_h$. The query matrix Q, the key matrix K, and the value matrix V each have a size of $N' \times D_h$. $D_h$ is the number of dimensions of the vector to be output by each of the attention mechanisms. $D_h$ is usually set to D/M.

Next, an attention matrix A is obtained using a softmax function given by the following equation (1).

$$A = \mathrm{softmax}(QK^T/\sqrt{D_h}) \tag{1}$$

The attention matrix A has a size of N'×N' and reflects all the tokens and the relevance between all the tokens therein.

Multiplying the attention matrix A by the value matrix V yields a matrix having a size of $N' \times D_h$. This matrix can be interpreted as one where the value of each token is updated by taking a weighted sum of the values of the other tokens depending on the magnitude of relevance with the other tokens.

The foregoing calculation is performed for each of the M attention mechanisms, whereby M matrices each having a size of $N' \times D_h$ are obtained. The M matrices are connected to obtain a matrix having a size of N'×D. Multiplying this matrix by a matrix having a size of D×D obtained through learning by the learning unit 209 yields a matrix having a size of N'×D where the results of the M attention mechanisms are integrated. The token sequence expressed by this matrix is finally output from the attention unit 503.

The first skip connection unit 504 adds the token sequence yet to be input to the first layer normalization unit 502 to the token sequence output from the attention unit 503. The second layer normalization unit 505 applies layer normalization to the token sequence output from the first skip connection unit 504. The layer normalization performed by the second layer normalization unit 505 is similar to the processing performed by the first layer normalization unit 502.

The MLP unit 506 performs a linear transformation, non-linear activation processing (such as Rectified Linear Unit (ReLU) processing and Gaussian Error Linear Unit (GELU) processing), and a linear transformation in this order independently on each token in the token sequence subjected to the layer normalization by the second layer normalization unit 505. The parameters of the linear transformations are also learned by the learning unit 209. The output of the MLP unit 506 is a matrix having a size of N'×D. The second skip connection unit 507 adds the output of the first skip connection unit 504 to the output of the MLP unit 506.

In this manner, the output of the second skip connection unit 507 is obtained as a result of a single round of encoding processing by the transformer encoder 501. As described above, the processing for updating the token sequence using an encoder such as the transformer encoder 501 is performed once or more, and the finally obtained token sequence is referred to as the encoded expression sequence.

Figure 3:
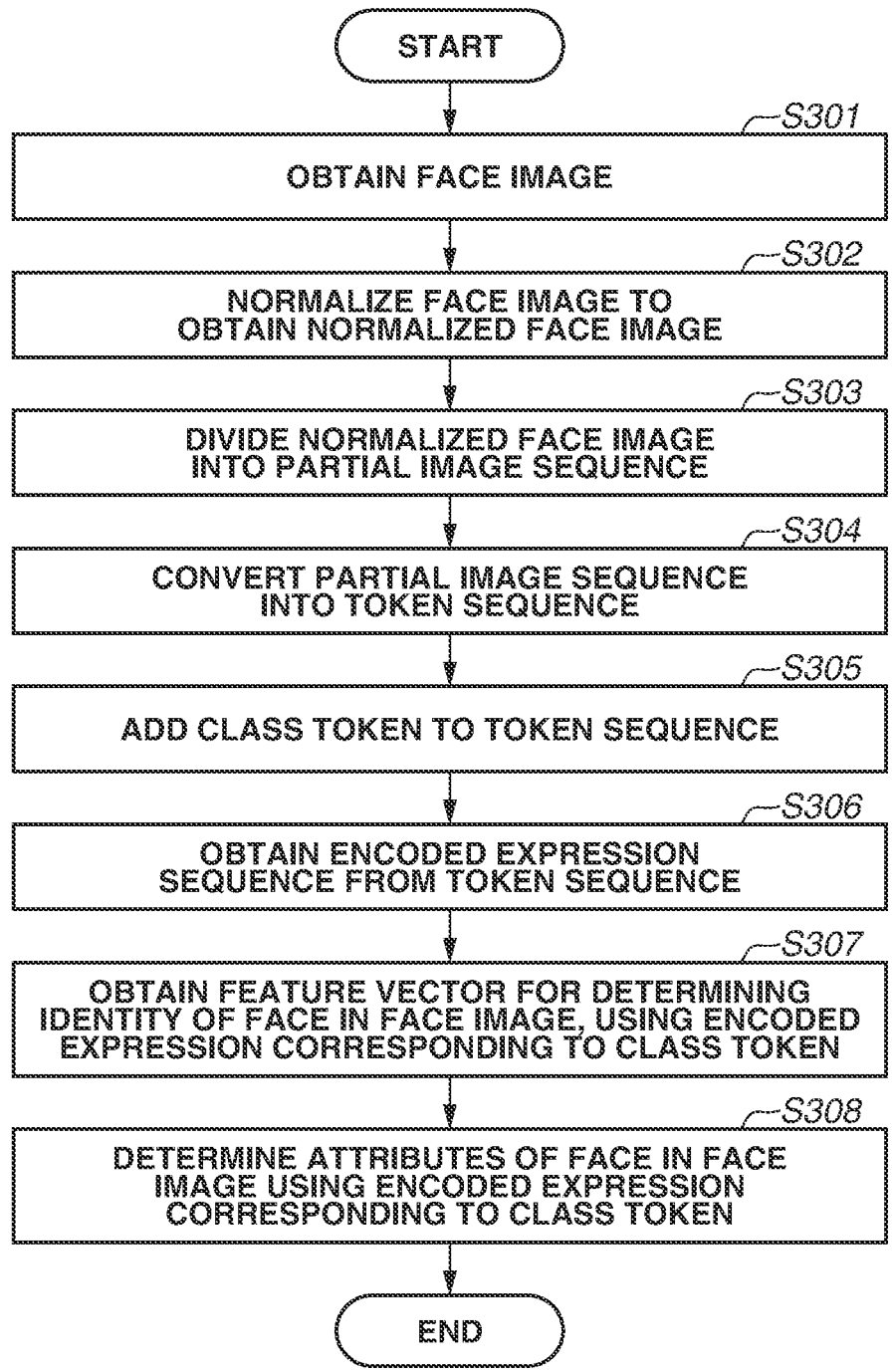
FIG. 3 is a flowchart illustrating an example of a procedure for inference processing according to the first exemplary embodiment.

Returning to the description of FIG. 3, in step S307, the feature extraction unit 207 obtains a feature vector for determining the identity of the face 410 in the face image 400, using an encoded expression 705 corresponding to the class token in an encoded expression sequence 704 obtained by the encoding unit 206. There are various methods for obtaining the feature vector. Methods for obtaining the feature vector will now be described.

A first method for obtaining the feature vector is to simply use the encoded expression 705 corresponding to the class token. In such a case, the number of dimensions of the feature vector is D.

A second method for obtaining the feature vector is to input the encoded expression 705 corresponding to the class token to a head 706 for feature vector conversion. The head 706 is typically a feedforward network (FFN) including one or more linear transformations. The number of dimensions of the feature vector is equal to the number of output dimensions of the head 706. As will be described below, the parameters of this FFN are learned by the learning unit 209.

Next, an example of a method for determining the identity of a face using the feature vector will be described.

For example, the face recognition unit 210 determines whether faces in two images are of the same person when the two face images are given.

The face recognition unit 210 initially extracts feature vectors $f_1$ and $f_2$ from the first and second face images, respectively. The feature vectors $f_1$ and $f_2$ are assumed to have the same number of dimensions. Next, the face recognition unit 210 calculates a degree of similarity between the two feature vectors $f_1$ and $f_2$ using a predetermined method. For example, if a cosine similarity is used, a similarity score is calculated by the following equation (2).

$$\text{Similarity score}(f_1, f_2) := \cos(\theta_{12}) = <f_1, f_2> / (|f_1| \cdot |f_2|) \quad (2)$$

In the equation (2), $\theta_{12}$ is the angle formed between the feature vectors $f_1$ and $f_2$, $<x, y>$ is the dot product of x and y, and $|x|$ is the length of x. If the similarity score is less than or equal to a predetermined threshold, the faces are determined to be of the same person. If the similarity score exceeds the threshold, the faces are determined to be of different persons. The method for calculating the degree of similarity is not limited to the foregoing, and any known methods such as the Euclidean distance may be used.

In step S308, the attribute determination unit 208 determines the attributes of the face 410 in the face image 400, using the encoded expression 705 corresponding to the class token in the encoded expression sequence 704 obtained by the encoding unit 206. Examples of the face attributes to be determined may include "whether a face mask is worn", "whether glasses (sunglasses) are worn", "face direction", "closed eyes" (whether the eyes are open or closed), "facial expression" (e.g., smiling face, angry face), "age", "race", and "gender". There are various methods for determining the attributes.

A first method for determining the attributes is to prepare a unique head for each attribute determination task. This head is typically an FFN including one or more linear transformations and an activation function such as a sigmoid function or a softmax function. The parameters of this FFN are also learned by the learning unit 209.

For example, a task head 707 for determining whether a face mask is worn can be formed by a neural network that solves a binary classification problem. An example thereof is a neural network where one or more rounds of linear transformation and activation processing are connected to a sigmoid function. In this case, the number of units of the final linear transformation is one, i.e., the output is a scalar value. The output is input to the sigmoid function, which outputs a continuous value of 0 to 1. This value can be interpreted as the probability of the face 410 in the face image 400 wearing a face mask.

For example, a task head 708 for determining age can be formed by a neural network that solves a regression problem if age is treated as a continuous value. The task head 708 can be formed by a neural network that solves a multiclass classification problem if age is treated as classes in steps of ten years. For example, in a case where the task head 708 is defined as solving a multiclass classification problem where age is classified into ten classes including ages 0 to 9, ages 10 to 19, . . . , ages 80 to 89, and ages 90 and over, the task head 708 can be formed by a neural network where one or more rounds of linear transformation and activation processing are connected to a softmax function. In this case, the number of units of the final linear transformation is 10. The outputs are input to the softmax function. The output of the softmax function can be interpreted as the probabilities of the age of the face 410 in the face image 400 belonging to the respective 10 classes.

Up to this point, the inference processing by the image processing apparatus 100 according to the present exemplary embodiment has been described to include both obtaining the feature vector in step S307 and determining the attributes in step S308. Alternatively, the inference processing may include one of the processes. Performing the process for an intended task can reduce the calculation time.

Next, a learning method of the image processing apparatus 100 according to the present exemplary embodiment will be described. As described above, performing multitask learning to simultaneously learn two tasks, i.e., the feature amount extraction task and the face attribute determination task can bring out high performance compared to a case where each task is learned independently.

Before multitask learning, learning data is to be collected in advance. A method for generating the learning data will now be described.

A large number of face images with known personal identifiers (IDs) are initially collected. Suppose that the number of different personal IDs in the learning data is C, and the personal IDs of 1 to C are sequentially assigned to the face images. Next, normalization processing is applied to the face images to obtain normalized face images. The method for generating a normalized face image is similar to the processing procedure of step S302. If the estimation of the positions of the organ points in a face image has failed, this face image is to be excluded from the learning data.

Next, correct answer data about the attributes of the face images is generated. For example, if two types of face attribute determinations are performed to determine whether a face mask is worn and determine age, the correct values of these attributes are given to all the collected face images. The correct values may be manually given, or may be automatically given using existing attribute discriminators and then manually corrected.

In learning the feature amount extraction task, a classification layer that inputs a feature vector and outputs a C-dimensional probability vector is connected at the end of the processing of the feature extraction unit 207. An i-th component (i is an integer greater than or equal to 1 and less than or equal C) of the C-dimensional probability vector expresses the probability of the face 410 in the face image 400 having the personal ID of i.

The learning unit 209 may be configured to perform learning processing on the feature extraction unit 207 focusing on the angle formed between the feature vectors output by the feature extraction unit 207. More specifically, the learning processing is performed on the feature extraction unit 207 so that the angle formed between the feature vectors output by the feature extraction unit 207 is small for images of the same person. The learning processing is also performed on the feature extraction unit 207 so that the angle formed between the feature vectors output by the feature extraction unit 207 is large for images of different persons.

Such learning processing can be implemented by a representative vector technique discussed in Deng, Jiankang, et al., "Arcface: Additive angular margin loss for deep face recognition", Proceedings of the IEEE Conference on Computer Vision and Pattern Recognition, 2019.

In the representative vector technique, the classification layer retains representative vectors $V_1$ to $V_C$ corresponding to the respective personal IDs (1 to C). The i-th component (i is an integer greater than or equal to 1 and less than or equal to C) of the C-dimensional probability vector to be output from the classification layer is calculated as a dot product of the feature vector output by the feature extraction unit 207 and the representative vector $V_i$.

Through learning based on backpropagation to be described below, the learning processing is performed so that, if an image with the correct personal ID of j (j is an integer greater than or equal to 1 and less than or equal to C) is given, the angle formed between the feature vector extracted from the given image and the representative vector $V_j$ is minimized. The learning processing is further performed so that the angles formed between the representative vector $V_j$ and the other representative vectors are maximized. Such a learning method is discussed in Deng, Jiankang, et al., "Arcface: Additive angular margin loss for deep face recognition", Proceedings of the IEEE Conference on Computer Vision and Pattern Recognition, 2019.

The classification layer connected to the feature extraction unit 207 during the learning processing and the representative vectors $V_1$ to $V_C$ may be collectively referred to as an additional block. The additional block is used during the learning processing and is not used during the inference processing.

Figure 6:
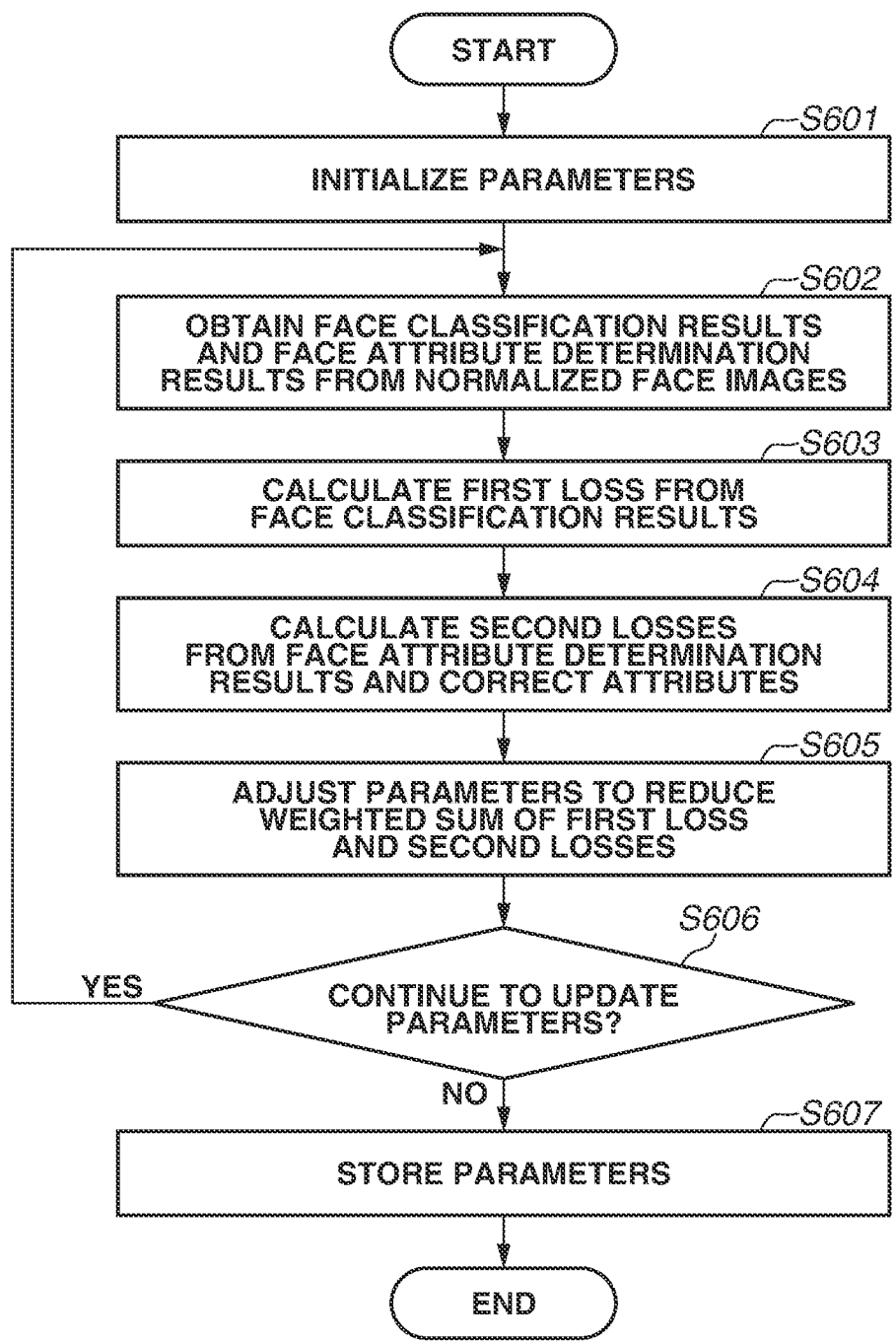
FIG. 6 is a flowchart illustrating an example of a procedure for learning processing according to the first exemplary embodiment.

Next, an example of a procedure for the learning processing by the image processing apparatus 100 according to the present exemplary embodiment will be described with reference to a flowchart of FIG. 6.

In step S601, the learning unit 209 of the image processing apparatus 100 initializes the parameters to be learned. The parameters to be learned include linear transformation parameters of the token conversion unit 204, and the parameters of the class token and the position encoding vectors to be added by the token addition unit 205. The parameters to be learned also include parameters to be used in the encoding processing by the encoding unit 206, linear transformation parameters of the feature extraction unit 207, the parameters of the additional block of the feature extraction unit 207, and attribute determination parameters of the attribute determination unit 208.

The learning unit 209 initializes the parameters using random initialization or zero initialization. Using a transfer learning framework, the learning unit 209 may initialize the parameters with those already learned in the other tasks.

In step S602, the image processing apparatus 100 obtains face classification results and face attribute determination results from normalized face images in the learning data. This method will be described step by step. The image processing apparatus 100 initially obtains the feature vector of a face and the attribute determination results of the face from a normalized face image through the processing of steps S301 to S308 in FIG. 3. Next, a probability vector expressing which of the personal ID classes (1 to C) the face in the normalized face image belongs to is obtained using the additional block of the feature extraction unit 207. The obtained probability vector is referred to as the face classification result. The processing of step S602 is simultaneously performed on a plurality of normalized face images randomly selected from the learning data, as mini-batch learning. Faster and more stable learning can thus be expected.

In step S603, the learning unit 209 calculates a first loss from the face classification results obtained in step S602 and the correct personal IDs. The first loss indicates an error in the face classification results. The higher the probabilities of the faces being classified into the correct personal ID classes, the lower the first loss. The lower the probabilities, the higher the first loss. For example, the first loss can be calculated using a multiclass cross-entropy error function that inputs the face classification results output from the classification layer connected to the feature extraction unit 207 and inputs one-hot vectors. The term "one-hot vector" refers to a C-dimensional vector where the j-th component is 1 and the other components are 0 if the correct personal ID of the face image is j (j is an integer greater than or equal to 1 and less than or equal to C).

In step S604, the learning unit 209 calculates second losses from the face attribute determination results obtained in step S602 and the correct attributes. The second losses are calculated respectively by selecting appropriate functions depending on the problem each attribute determination boils down to. For example, if the attribute determination boils down to a binary classification problem, the second loss is calculated using a binary cross-entropy error function. If the attribute determination boils down to a multiclass classification problem, the second loss is calculated using a multiclass cross-entropy error function. If the attribute determination boils down to a regression problem, the second loss is calculated using a squared error function or an absolute error function.

In step S605, the learning unit 209 adjusts the parameters as the learning targets so as to reduce the weighted sum of the first loss and the second losses. This method will be described step by step. The learning unit 209 initially calculates a loss L by taking the weighted sum using hyperparameters $\lambda_i$ (i is an integer greater than or equal to 1 and less than or equal to A) set in advance. More specifically, the loss L is calculated by the following equation (3).

$$L = L_0 + \sum_{i=1}^{A}(\lambda_i L_i) \quad (3)$$

where $L_0$ is the first loss, A is the number of problems in the attribute determinations, and $L_1$ to $L_A$ are the respective second losses of the problems in the attribute determinations.

Next, the learning unit 209 updates the parameters as the learning targets so as to reduce the loss L. The parameters are finely updated toward a direction that reduces the loss L by using backpropagation that is commonly used in deep networks. The parameters are learned so as to reduce the weighted sum of the loss of the feature amount extraction task and the losses of the face attribute determination task at the same time. The learning processing is thereby performed on the feature extraction unit 207 so that the feature extraction unit 207 is capable of outputting a feature vector that enables the extraction of the feature vector of the face and the determination of the attributes of the face to be both performed at the same time with high accuracy.

In step S606, the learning unit 209 determines whether to continue to update the parameters.

The determination criterion is based on whether the number of iterations of the learning has reached a sufficient number or whether the performance of the model is sufficiently improved. If either of the criteria is satisfied, the learning unit 209 determines to end the update of the parameters (NO in step S606), and the processing proceeds to step S607. If neither of the criteria is satisfied (YES in step S606), the processing returns to step S602 to continue the learning.

In step S607, the learning unit 209 stores the learned parameters into the storage unit 12. The stored parameters are used when the image processing apparatus 100 performs the inference processing or when the image processing apparatus 100 performs the learning processing again.

As described above, the image processing apparatus 100 according to the present exemplary embodiment can improve the performance of the transformer model-based feature extractor by introducing the multitask learning framework.

In a second exemplary embodiment, a configuration using two class tokens will be described. A description of similarities between the first and second exemplary embodiments will be omitted, and differences from the first exemplary embodiment will be described.

In the first exemplary embodiment, the description has been given of the configuration where one class token is added to the token sequence obtained from the partial image sequence, and the obtainment of the feature vector and the determination of the face attributes are both performed using an encoded expression corresponding to the class token. In the present exemplary embodiment, suppose, for example, that one of two face images including the same person is a face image (an image a) of a face wearing a face mask, and the other is a face image (an image b) of a face not wearing a face mask. Since the two face images are of the same person, the distance between the feature vectors extracted from the respective images is desirable to be as small as possible. On the other hand, the correct attribute determination results of the two face images are such that the image a is with a face mask and the image b is without a face mask. Thus, in the case of two face images of the same person, the feature vectors that well express the identity of the person are to be extracted in the feature amount extraction task, regardless of a change in appearance or age between the face images. By contrast, a different determination result is to be obtained from each of the images in the face attribute determination task.

In the present exemplary embodiment, taking into consideration the foregoing difference in nature between the feature amount extraction task and the face attribute determination task, a configuration capable of making accurate inferences in the feature amount extraction task and the face attribute determination task by using two class tokens will be described. An example of an inference processing procedure by the image processing apparatus 100 according to the present exemplary embodiment will be described with reference to a flowchart of FIG. 8 and a conceptual diagram of FIG. 9. The internal configuration of the image processing apparatus 100 is similar to that in the first exemplary embodiment. A description thereof will thus be omitted, and differences from the inference processing of FIG. 3 will be described.

Figure 8:
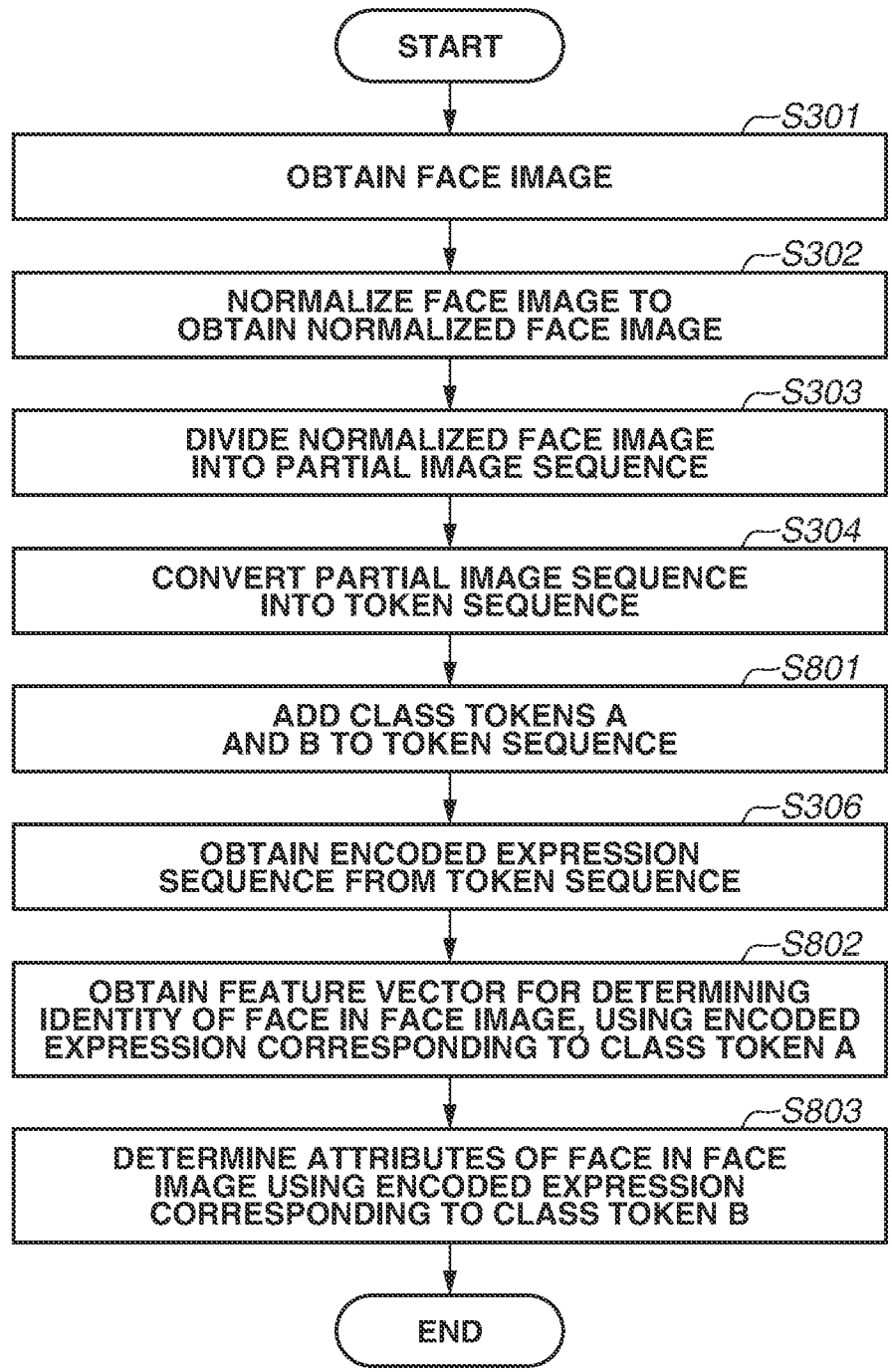
FIG. 8 is a flowchart illustrating an example of a procedure for inference processing according to a second exemplary embodiment.
Figure 9:
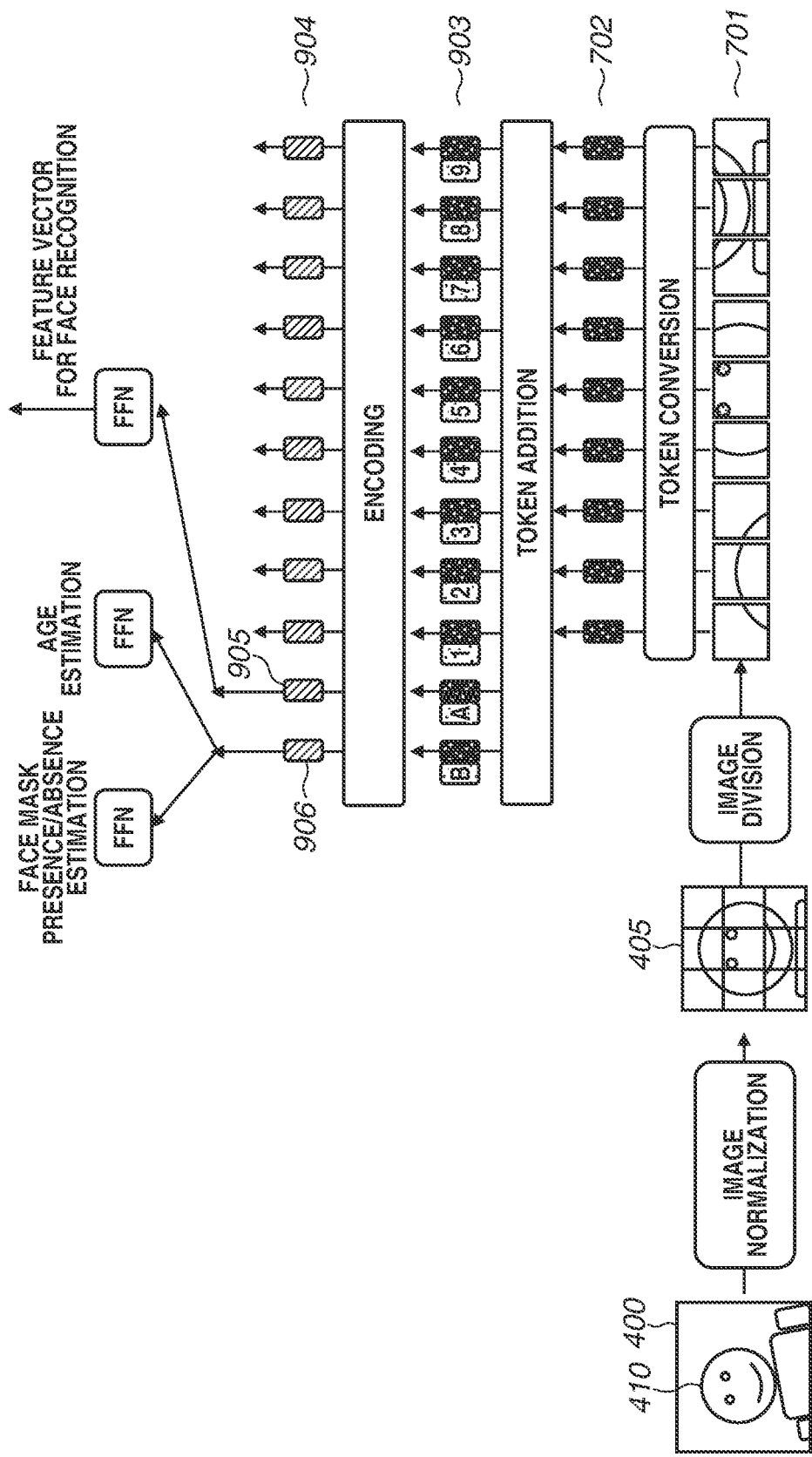
FIG. 9 is a schematic diagram illustrating the inference processing according to the second exemplary embodiment.

Steps S301 to S304 of FIG. 8 are similar to steps S301 to S304 of FIG. 3, respectively. In step S801, the token addition unit 205 adds two D-dimensional class tokens A and B to the token sequence 702 obtained by the token conversion unit 204 to obtain a new token sequence 903. The length of the token sequence 903 obtained by this processing is N+2 (=N'). Similarly to the first exemplary embodiment, the parameters of the class tokens A and B are learned by the learning unit 209. In the example of FIG. 9, the token located at the left end of the token sequence 903 is the class token B, and the second token from the left is the class token A. The encoding unit 206 then performs similar processing to that of step S306 in FIG. 3.

In step S802, the feature extraction unit 207 obtains a feature vector for determining the identity of the face 410 in the face image 400, using an encoded expression 905 corresponding to the class token A in an encoded expression sequence 904 obtained by the encoding unit 206. The method for obtaining the feature vector is similar to the method described with reference to step S307 of FIG. 3.

In step S803, the attribute determination unit 208 determines the attributes of the face 410 in the face image 400, using an encoded expression 906 corresponding to the class token B in the encoded expression sequence 904 obtained by the encoding unit 206. The method for determining the attributes is similar to the method described with reference to step S308 of FIG. 3.

The above is the description of the example of the inference processing procedure by the image processing apparatus 100 according to the present exemplary embodiment. The number N' of tokens after the class token addition is N+1 in the first exemplary embodiment and N+2 in the present exemplary embodiment. Since the order of the time complexity of the inference is given by $O(N'^2)$ (O is the Landau symbol), the order of the time complexity does not vary much if the number of class tokens is increased by one.

A learning processing procedure by the image processing apparatus 100 according to the present exemplary embodiment is similar to that in the first exemplary embodiment except for the use of two class tokens. More specifically, in step S602 in the present exemplary embodiment, face classification results and face attribute determination results are obtained according to the procedure illustrated in FIG. 8.

As described above, according to the present exemplary embodiment, different class tokens are provided for the respective tasks, i.e., the feature amount extraction task and the face attribute determination task. The class tokens can thus be tailored to output the optimum encoded expressions for the respective tasks, whereby more accurate inferences can be made in the feature amount extraction task and the face attribute determination task.

In the second exemplary embodiment, one class token for the feature amount extraction task and one class token for the face attribute determination task are added to the token sequence obtained from the partial image sequence. Then, the feature vector is obtained using the encoded expression corresponding to the class token for the feature amount extraction task, and the face attributes are determined using the encoded expression corresponding to the class token for the face attribute determination task. In some use cases, face images of the same person are observed from a fixed point for a long period of time to repeat the face attribute determination task, using a fixed camera installed at a certain position. Attributes such as "whether a face mask is worn", "whether sunglasses are worn", "face direction", "closed eyes", "facial expression", and "age" are likely to change, and attributes such as "race" and "gender" are unlikely to change.

Optimum encoded expressions based on the changeability of the attributes are thus expected to be acquired by dividing the attributes into classes depending on the changeability of the attributes and assigning different class tokens to the respective classes.

Figure 10:
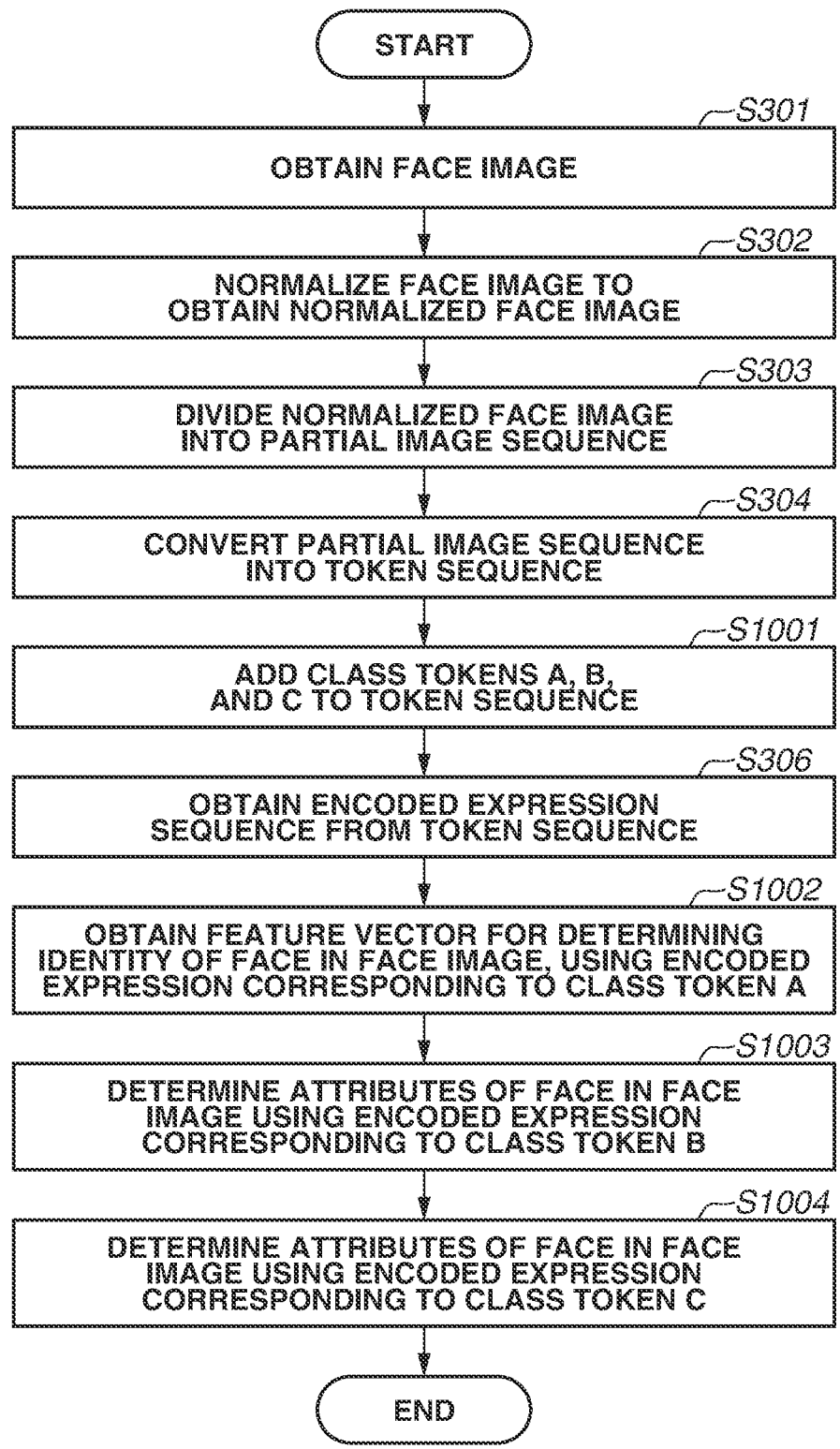
FIG. 10 is a flowchart illustrating an example of a procedure for inference processing according to a third exemplary embodiment.

In a third exemplary embodiment, taking into account the foregoing difference in nature in the face attribute determination task, a configuration capable of making more accurate inferences in the feature amount extraction task and the face attribute determination task by using three or more class tokens will thus be described. An example of an inference processing procedure by the image processing apparatus 100 according to the present exemplary embodiment will be described with reference to a flowchart of FIG. 10 and a conceptual diagram of FIG. 11. The internal configuration of the image processing apparatus 100 is similar to that in the first exemplary embodiment. A description thereof will thus be omitted, and differences from the inference processing of FIG. 3 will be described.

Figure 11:
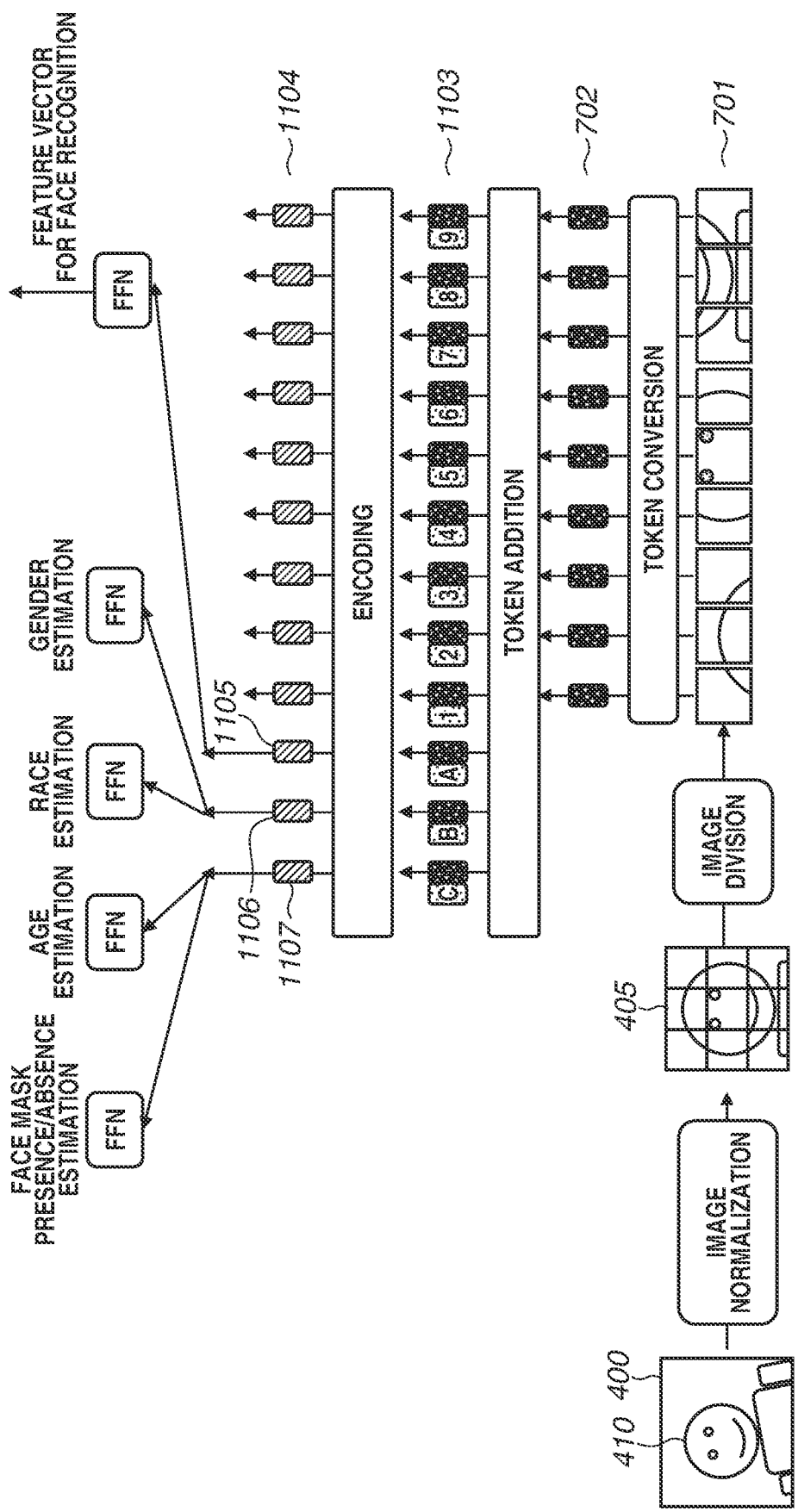
FIG. 11 is a schematic diagram illustrating the inference processing according to the third exemplary embodiment.

In step S1001, the token addition unit 205 adds three D-dimensional class tokens A, B, and C to the token sequence 702 obtained by the token conversion unit 204 to obtain a new token sequence 1103. The length of the token sequence 1103 obtained by this processing is N+3 (=N'). Similarly to the first exemplary embodiment, the parameters of the class tokens A, B, and C are learned by the learning unit 209. In the example of FIG. 11, the class tokens C, B, and A are arranged in order from the left end of the token sequence 1103. The encoding unit 206 then performs processing similar to that of step S306 in FIG. 3.

In step S1002, the feature extraction unit 207 obtains a feature vector for determining the identity of the face 410 in the face image 400, using an encoded expression 1105 corresponding to the class token A in an encoded expression sequence 1104 obtained by the encoding unit 206. The method for obtaining the feature vector is similar to the method described with reference to step S307 of FIG. 3.

In step S1003, the attribute determination unit 208 determines attributes of the face 410 in the face image 400, using an encoded expression 1106 corresponding to the class token B in the encoded expression sequence 1104 obtained by the encoding unit 206. The attributes to be determined at this time are those unlikely to change between face images of the same person, such as "gender" and "race". The method for determining the attributes is similar to the method described with reference to step S308 of FIG. 3.

In step S1004, the attribute determination unit 208 determines attributes of the face 410 in the face image 400, using an encoded expression 1107 corresponding to the class token C in the encoded expression sequence 1104 obtained by the encoding unit 206. The attributes to be determined at this time are those likely to change even between face images of the same person, such as "whether a face mask is worn" and "age". The method for determining the attributes is similar to the method described with reference to step S308 of FIG. 3.

The above is the description of the example of the inference processing procedure by the image processing apparatus 100 according to the present exemplary embodiment. The number N' of tokens after the class token addition is N+1 in the first exemplary embodiment and N+3 in the present exemplary embodiment. Similarly to the second exemplary embodiment, the order of the time complexity of the inference does not change much if the number of class tokens is increased by two. In the foregoing example, the attributes are divided into two classes depending on the changeability, and one class token is provided for each of the classes. Alternatively, the attributes may be divided into P classes (P is an integer greater than or equal to 3 and less than or equal to the number of attributes) based on the changeability, and one class token may be provided for each of the classes. The learning processing procedure by the image processing apparatus 100 according to the present exemplary embodiment is similar to that in the first exemplary embodiment except for the use of three or more class tokens. More specifically, in step S602 in the present exemplary embodiment, face classification results and face attribute determination results are obtained according to the procedure illustrated in FIG. 10.

As described above, according to the present exemplary embodiment, one class token is provided for the feature amount extraction task and two or more class tokens are provided for the attribute determination task, focusing on the changeability of the attributes. The class tokens can thus be tailored to output the optimum encoded expressions for the respective tasks, whereby more accurate inferences can be made in the feature amount extraction task and the attribute determination task.

In a fourth exemplary embodiment, a configuration that determines a face attribute at a low layer of an encoder and changes weights in the remaining layers of the encoder based on a result of the face attribute determination will be described. In the present exemplary embodiment, the same feature extraction is performed partway regardless of the result of the face attribute determination, and feature extraction parameters are thereafter changed based on the result of the face attribute determination to enable accurate feature extraction with low complexity. A description of similarities between the first to third exemplary embodiments and the fourth exemplary embodiment will be omitted, and differences therefrom will be described.

Figure 15:
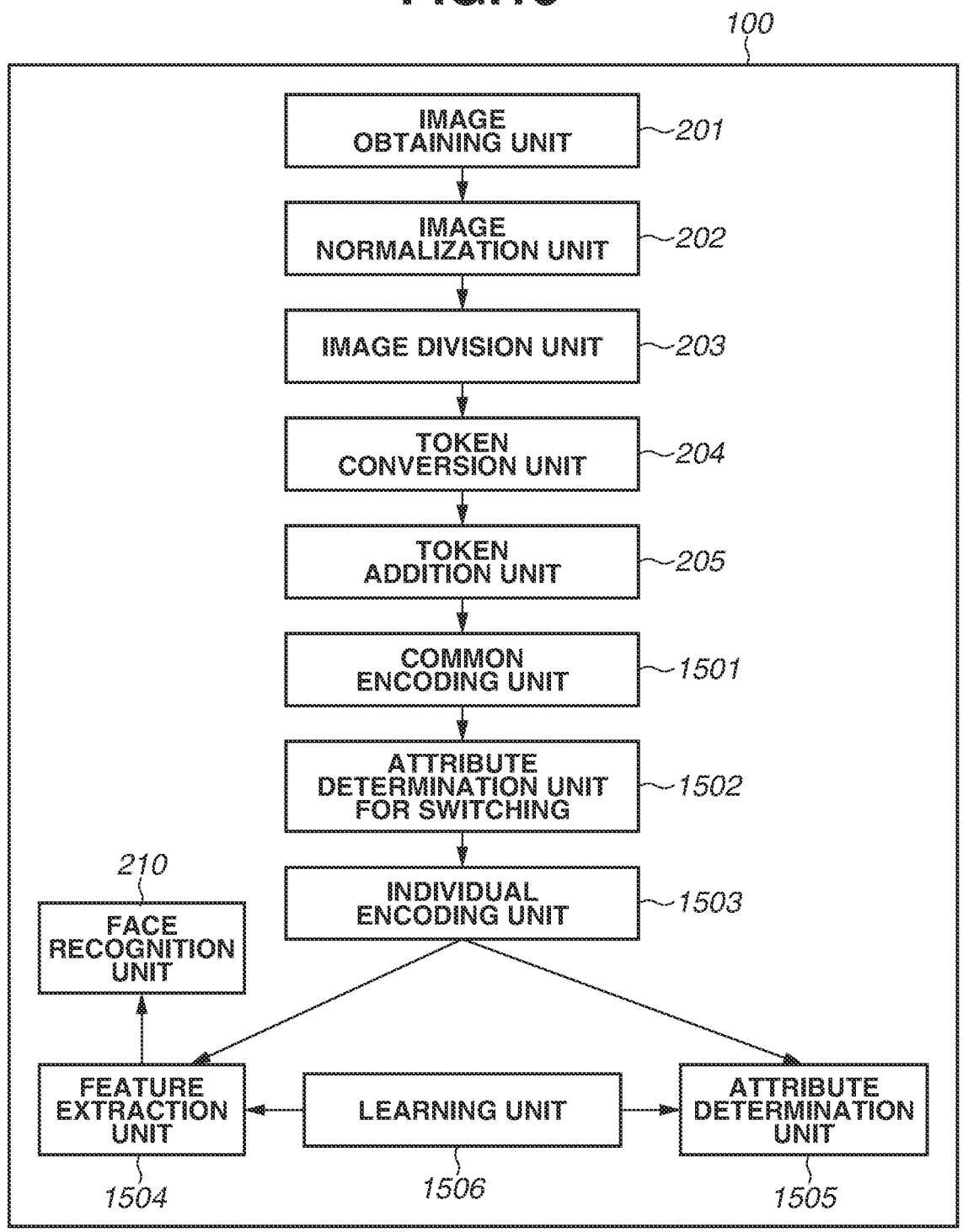
FIG. 15 is a block diagram illustrating a functional configuration example of an image processing apparatus according to the fourth exemplary embodiment.

FIG. 15 is a block diagram illustrating a functional configuration example of the image processing apparatus 100 according to the present exemplary embodiment. Differences from FIG. 2 will be described.

A common encoding unit 1501 performs encoding processing for token sequence update, on the token sequence obtained by the token addition unit 205 once or more. The token sequence finally obtained by the common encoding unit 1501 repeating the encoding processing is referred to as a first encoded expression sequence 1302.

An attribute determination unit for switching 1502 determines an attribute of the face 410 in the face image 400, using a part of the first encoded expression sequence 1302 obtained by the common encoding unit 1501.

An individual encoding unit 1503 switches weight parameters for the rest of the encoding processing, based on the result of the face attribute determination by the attribute determination unit for switching 1502. The individual encoding unit 1503 further performs encoding processing for token sequence update, on the first encoded expression sequence 1302 once or more using the switched weight parameters. The token sequence finally obtained by the individual encoding unit 1503 repeating the encoding processing is referred to as a second encoded expression sequence 1304.

A feature extraction unit 1504 obtains a feature vector for determining the identity of the face 410 in the face image 400, using a part of the second encoded expression sequence 1304 obtained by the individual encoding unit 1503.

An attribute determination unit 1505 determines attributes of the face 410 in the face image 400, using a part of the second encoded expression sequence 1304 obtained by the individual encoding unit 1503.

A learning unit 1506 performs overall processing related to learning processing.

Figure 12:
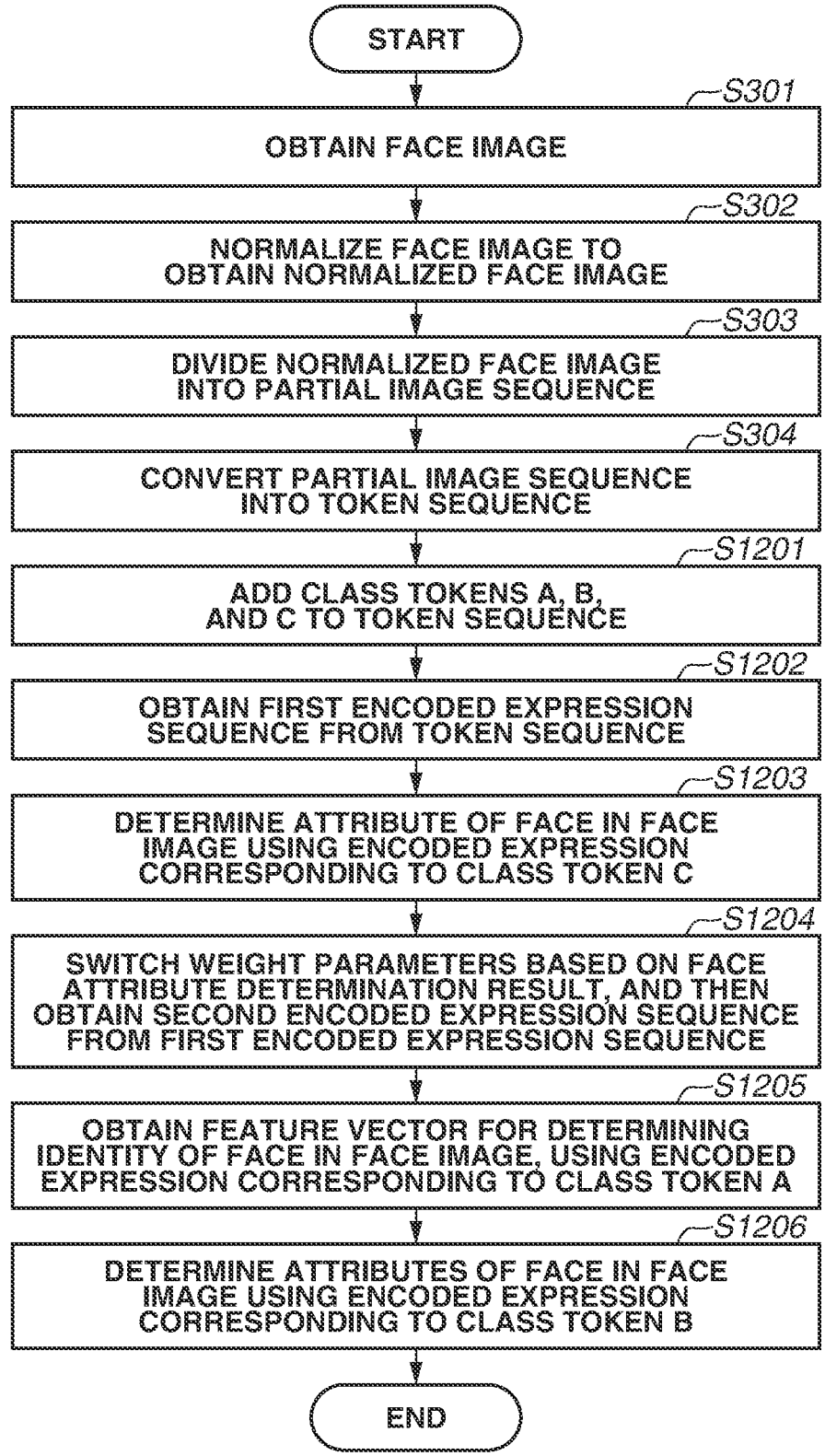
FIG. 12 is a flowchart illustrating an example of a procedure for inference processing according to a fourth exemplary embodiment.
Figure 13:
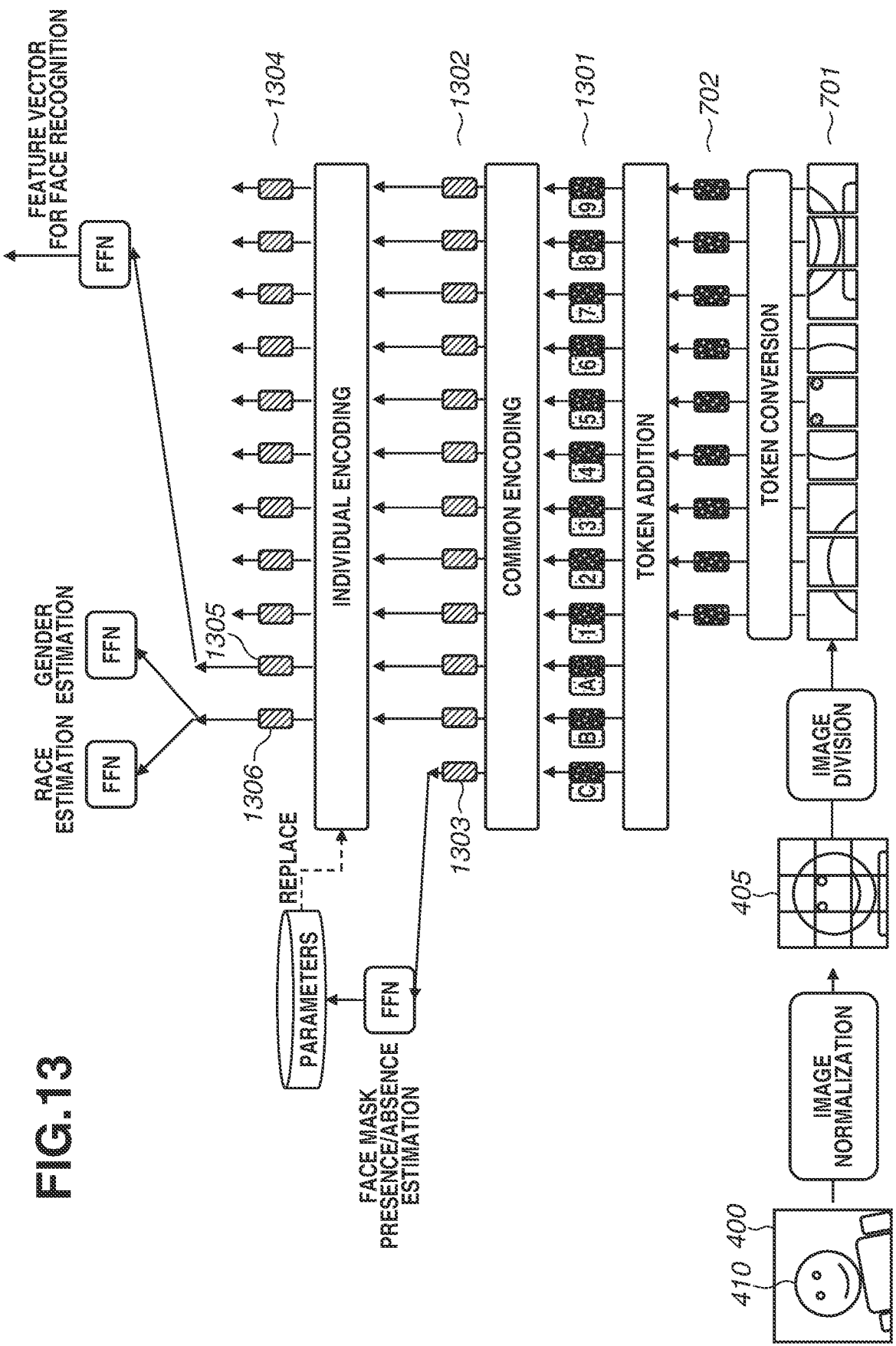
FIG. 13 is a schematic diagram illustrating the inference processing according to the fourth exemplary embodiment.

Next, an example of an inference processing procedure by the image processing apparatus 100 according to the present exemplary embodiment will be described with reference to a flowchart of FIG. 12 and a conceptual diagram of FIG. 13. Differences from the inference processing of FIG. 3 will be described.

In step S1201, the token addition unit 205 adds three D-dimensional class tokens A, B, and C to the token sequence 702 obtained by the token conversion unit 204 to obtain a new token sequence 1301. The length of the token sequence 1301 obtained by this processing is N+3 (=N'). Similarly to the first exemplary embodiment, the parameters of the class tokens A, B, and C are learned in advance through a learning phase. In the example of FIG. 13, the class tokens C, B, and A are arranged in order from the left end of the token sequence 1301.

In step S1202, the common encoding unit 1501 performs the encoding processing for token sequence update, on the token sequence 1301 obtained by the token addition unit 205 once or more to obtain the first encoded expression sequence 1302. Details of the encoding processing are similar to those of the method described with reference to step S306 of FIG. 3. This encoding processing is constantly performed regardless of the attributes of the face 410.

In step S1203, the attribute determination unit for switching 1502 determines an attribute of the face 410 in the face image 400, using an encoded expression 1303 corresponding to the class token C in the first encoded expression sequence 1302 obtained by the common encoding unit 1501. In the following description, the attribute determination unit for switching 1502 is assumed to determine whether a face mask is worn, but the attribute determination item is not limited thereto and any one or more types of attribute determinations may be made. For example, the attribute determination unit for switching 1502 may determine a face direction attribute and a race attribute. The method for determining the attribute(s) based on the encoded expression 1303 is similar to that described with reference to step S308 of FIG. 3.

In step S1204, the individual encoding unit 1503 switches the weight parameters for the rest of the encoding processing, based on the result of the attribute determination unit for switching 1502 in step S1203. For example, if, in step S1203, the face 410 is determined to not wear a face mask, the individual encoding unit 1503 switches the weight parameters to those optimized for a face image without a face mask. If the face 410 is determined to wear a face mask, the individual encoding unit 1503 switches the weight parameters to those optimized for a face image with a face mask.

In step S1204, the individual encoding unit 1503 performs the encoding processing for token sequence update, on the first encoded expression sequence 1302 once or more using the switched weight parameters to obtain the second encoded expression sequence 1304. Details of the encoding processing are similar to those of the method described with reference to step S306 of FIG. 3.

In step S1205, the feature extraction unit 1504 obtains a feature vector for determining the identity of the face 410 in the face image 400, using an encoded expression 1305 corresponding to the class token A in the second encoded expression sequence 1304 obtained by the individual encoding unit 1503. The method for obtaining the feature vector is similar to that described with reference to step S307 of FIG. 3.

In step S1206, the attribute determination unit 1505 determines attributes of the face 410 in the face image 400, using an encoded expression 1306 corresponding to the class token B in the second encoded expression sequence 1304 obtained by the individual encoding unit 1503. The method for determining the attributes is similar to that described with reference to step S308 of FIG. 3.

Figure 14:
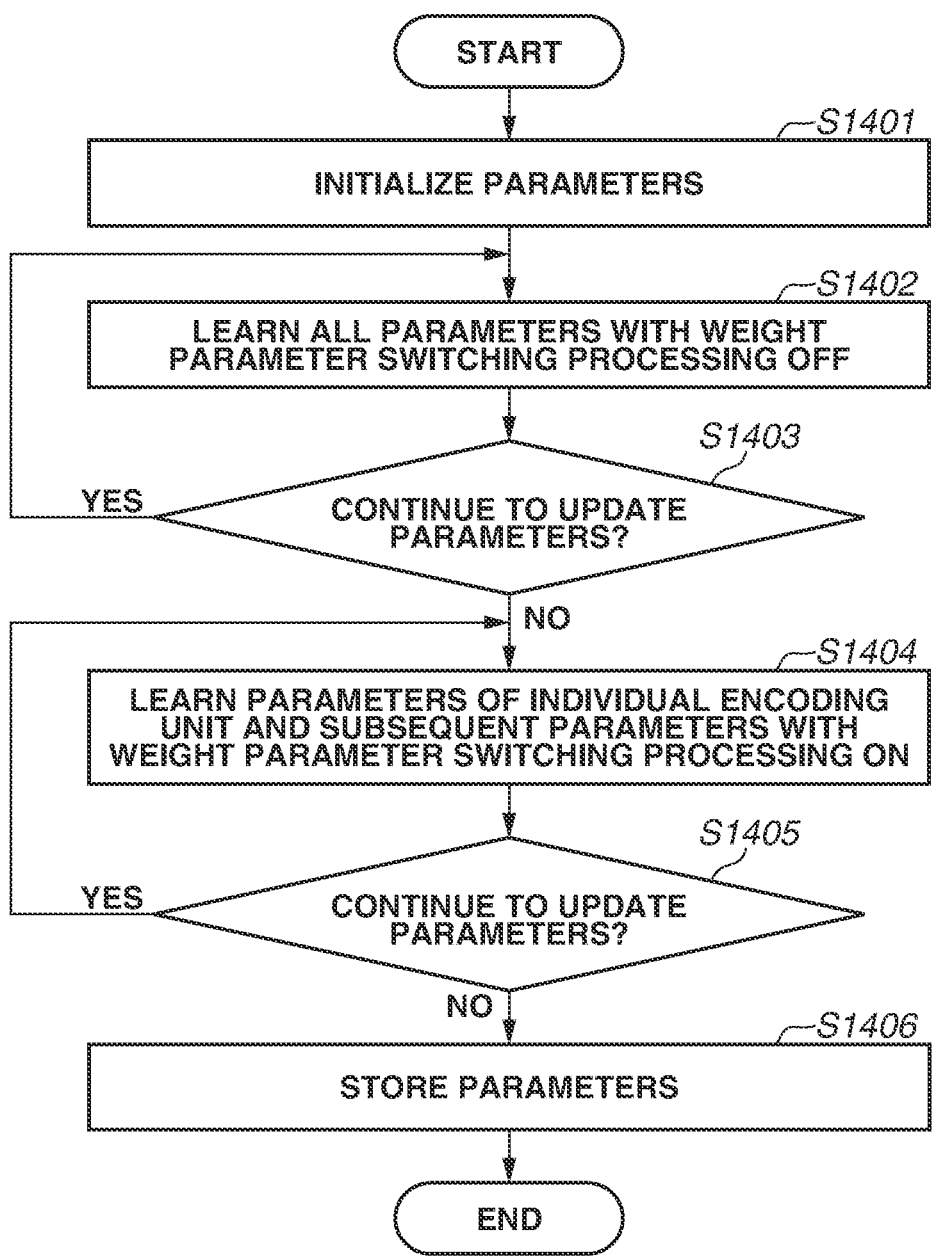
FIG. 14 is a flowchart illustrating an example of a procedure for learning processing according to the fourth exemplary embodiment.

Next, a learning processing procedure by the image processing apparatus 100 according to the present exemplary embodiment will be described with reference to a flowchart of FIG. 14.

In step S1401, the learning unit 1506 initializes the parameters to be learned. The method for initializing the parameters is similar to that described with reference to step S601 of FIG. 6.

In step S1402, the learning unit 1506 learns the parameters as the learning targets in a state where the weight parameter switching processing in step S1204 is off. In other words, the learning unit 1506 learns the parameters as the learning targets without switching the weight parameters to those to be used by the individual encoding unit 1503. The parameter learning method will now be briefly described. A loss is initially defined as a weighted sum of a loss of the attribute determination unit for switching 1502, a loss of the feature extraction unit 1504, and a loss of the attribute determination unit 1505. The coefficients of the weighted sum are hyperparameters. Next, the parameters as the learning targets are updated so as to reduce the loss. The parameters are finely updated toward the direction that reduces the loss by using backpropagation that is commonly used in deep neural networks (DNNs).

In step S1403, the learning unit 1506 determines whether to continue to update the parameters. The determination criterion is based on whether the number of iterations of the learning has reached a sufficient number, or whether the performance of the model is sufficiently improved. If either of the criteria is satisfied, the learning unit 1506 determines to end the update of the parameters (NO in step S1403), and the processing proceeds to step S1404. If neither of the criteria is satisfied (YES in step S1403), the processing returns to step S1402 to continue the learning.

In step S1404, the learning unit 1506 fixes the parameters up to those of the common encoding unit 1501 and excludes the fixed parameters from the learning targets. The individual encoding unit 1503 then prepares as many duplicates of weights related to the individual encoding unit 1503 as the number of attribute classes to be determined by the attribute determination unit for switching 1502. For example, if the attribute determination unit for switching 1502 determines whether a face mask is worn as the face attribute, the individual encoding unit 1503 prepares two duplicates of the weight parameters of the individual encoding unit 1503 learned in step S1402, for an image without a face mask and an image with a face mask. The learning unit 1506 then updates one of the duplicates of the weight parameters based on the result of the determination by the attribute determination unit for switching 1502.

In step S1405, the learning unit 1506 determines whether to continue to update the parameters. Similarly to step S1403, the determination criterion is based on whether the number of iterations of the learning has reached a sufficient number, or whether the performance of the model is sufficiently improved. If either of the criteria is satisfied, the learning unit 1506 determines to end the update of the parameters (NO in step S1405), and the processing proceeds to step S1406. If neither of the criteria is satisfied (YES in step S1405), the processing returns to step S1404 to continue the learning.

In step S1406, the learning unit 1506 stores the learned parameters in the storage unit 12. The stored parameters are used when the image processing apparatus 100 performs the inference processing or when the image processing apparatus 100 performs the learning processing again.

As described above, according to the present exemplary embodiment, a part of the face attributes can be determined at a lower layer of the encoder and the weight parameters for the rest of the layers of the encoder can be changed based on a result of the face attribute determination. Since the calculation at the lower layer of the encoder is commonly used, optimum feature extraction based on the result of the face attribute determination can be performed with reduced complexity.

The exemplary embodiments of the present disclosure can also be implemented by processing that supplies a program for implementing one or more functions according to the foregoing exemplary embodiments to a system or an apparatus via a network or a storage medium, and causes one or more processors in a computer of the system or the apparatus to read and execute the program. The exemplary embodiments of the present disclosure can also be implemented by a circuit (e.g., an application specific integrated circuit (ASIC)) for implementing one or more functions according to the foregoing exemplary embodiments.

Each of the foregoing exemplary embodiments merely illustrates an example of an embodiment in carrying out the present disclosure, and the technical scope of the present disclosure should not be interpreted limitedly by the exemplary embodiments.

The exemplary embodiments of the present disclosure can be implemented in various forms without departing from the technical concept or essential features thereof.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-207286, filed Dec. 21, 2021, which is hereby incorporated by reference herein in its entirety.

What is claimed is:

1. An image processing apparatus configured to perform multitask learning to learn a main task of extracting a feature amount of an object and a sub task of determining an attribute of the object, the image processing apparatus comprising:
   at least one memory storing instructions; and
   at least one processor that, upon execution of the stored instructions, is configured to operate as:
   an obtaining unit configured to obtain an image including the object;
   a division unit configured to divide the obtained image into a plurality of partial images;
   a conversion unit configured to convert the plurality of partial images into tokens, the tokens being vectors having a fixed dimension;
   an addition unit configured to add a class token to a sequence of the tokens, the class token having the fixed dimension corresponding to the tokens;
   an encoding unit configured to update the sequence of the tokens to which the class token is added based on relevance between the tokens, thereby generating an updated class token from the class token;
   an extraction unit configured to extract the feature amount of the object using the updated class token; and
   a determination unit configured to determine the attribute of the object using the updated class token
   wherein the object is a person's face, and
   wherein the attribute includes at least one or more of whether a face mask is worn, whether glasses are worn, a face direction, closed eyes, a facial expression, an age, a race, or a gender.

2. The image processing apparatus according to claim 1, wherein the addition unit is configured to add one class token having the fixed dimension corresponding to the tokens to the sequence of the tokens obtained by the conversion unit,
   wherein the extraction unit is configured to extract the feature amount of the object using the updated class token, and wherein the determination unit is configured to determine the attribute of the object using the same class token as the updated class token used by the extraction unit.

3. The image processing apparatus according to claim 1, wherein the addition unit is configured to add, as the class token, a first class token and a second class token to the sequence of the tokens,
wherein the encoding unit is configured to update both a first class token and a second class token based on relevance between the tokens, thereby generating an updated first class token and an updated second class token,
wherein the extraction unit is configured to extract the feature amount of the object using the updated first class token, and
wherein the determination unit is configured to determine the attribute of the object using the updated second class token.

4. The image processing apparatus according to claim 3, wherein the addition unit is configured to add, as the class token, first to N-th class tokens, where N is an integer greater than or equal to 3, to the sequence of the tokens,
wherein the encoding unit is configured to update the first to N-th class tokens based on relevance between the tokens, thereby generating an updated first class token and updated second to N-th class tokens,
wherein the extraction unit is configured to extract the feature amount of the object using the updated first class token, and
wherein the determination unit is configured to determine the attribute of the object using one of the updated second to N-th class tokens.

5. The image processing apparatus according to claim 4, wherein the determination unit is configured to change the class token to be used to determine the attribute of the object depending on whether the attribute is a mutable attribute or not.

6. The image processing apparatus according to claim 1, wherein the encoding unit is configured to:
obtain a query matrix, a key matrix, and a value matrix from the sequence of the tokens to which the class token is added,
obtain an attention matrix where all the tokens and relevance between all the tokens are reflected based on a product of the query matrix and the key matrix, and
update the sequence of the tokens based on a product of the attention matrix and the value matrix.

7. The image processing apparatus according to claim 1, wherein the multitask learning is performed by updating parameters used by the conversion unit, the addition unit, the encoding unit, the extraction unit, and the determination unit so that a weighted sum of an error in the extracted feature amount with respect to correct answer data and an error in a result of the determination with respect to correct answer data is reduced to be less than a given value.

8. The image processing apparatus according to claim 1, wherein the conversion unit is configured to convert the plurality of partial images into the tokens by performing conversion processing including a linear transformation.

9. The image processing apparatus according to claim 1, wherein the addition unit is configured to further add, to the respective tokens, vectors related to positions of the plurality of partial images in the image.

10. The image processing apparatus according to claim 1, wherein execution of the stored instructions further configures the at least one processor to operate as a recognition unit configured to determine whether objects included in two images are the same as each other based on respective feature amounts of the objects extracted by the extraction unit.

11. An image processing apparatus configured to perform multitask learning to learn a main task of extracting a feature amount of an object and a sub task of determining an attribute of the object, the image processing apparatus comprising:
at least one memory storing instructions; and
at least one processor that, upon execution of the stored instructions, is configured to operate as:
an obtaining unit configured to obtain an image including the object;
a division unit configured to divide the obtained image into a plurality of partial images;
a conversion unit configured to convert the plurality of partial images into tokens, the tokens being vectors having a fixed dimension;
an addition unit configured to add class tokens to a sequence of the tokens, the class tokens having the fixed dimension corresponding to the tokens;
a first encoding unit configured to update the sequence of the tokens to which the class tokens are added based on relevance between the tokens, thereby generating first updated class tokens;
a first determination unit configured to determine a first attribute of the object using the first updated class tokens;
a second encoding unit configured to further update the sequence of the tokens and the first updated class tokens updated by the first encoding unit based on relevance between the tokens and the determined first attribute, thereby generating second updated class tokens;
an extraction unit configured to extract the feature amount of the object using the second updated class tokens; and
a second determination unit configured to determine a second attribute of the object using the second updated-class tokens;
wherein the object is a person's face, and
wherein the attribute includes at least one or more of whether a face mask is worn, whether glasses are worn, a face direction, closed eyes, a facial expression, an age, a race, or a gender.

12. A method for controlling an image processing apparatus configured to perform multitask learning to learn a main task of extracting a feature amount of an object and a sub task of determining an attribute of the object, the method comprising:
obtaining an image including the object;
dividing the obtained image into a plurality of partial images;
converting the plurality of partial images into tokens, the tokens being vectors having a fixed dimension;
adding a class token to a sequence of the tokens, the class token having the fixed dimension corresponding to the tokens;
updating, in encoding, the sequence of the tokens to which the class token is added based on relevance between the tokens thereby generating an updated class token from the class token;
extracting the feature amount of the object using the updated class token; and
determining the attribute of the object using the updated class token,
wherein the object is a person's face, and wherein the attribute include at least one or more of whether a face mask is worn, whether glasses are worn, a face direction, closed eyes, a facial expression, an age, a race or a gender.

13. A method for controlling an image processing apparatus configured to perform multitask learning to learn a main task of extracting a feature amount of an object and a sub task of determining an attribute of the object, the method comprising:

obtaining an image including the object;

dividing the obtained image into a plurality of partial images;

converting the plurality of partial images into tokens, the tokens being vectors having a fixed dimension;

adding class tokens to a sequence of the tokens, the class tokens having the fixed dimension corresponding to the tokens;

updating, in first encoding, the sequence of the tokens to which the class tokens are added based on relevance between the tokens thereby generating first updated class tokens;

determining, in a first determination, a first attribute of the object using the first updated class tokens;

further updating, in second encoding, the sequence of the tokens and the first updated class tokens updated in the first encoding based on relevance between the tokens and the determined first attribute thereby generating second updated class tokens;

extracting the feature amount of the object using the second updated class tokens in the second encoding; and determining, in a second determination, a second attribute of the object using the second updated class tokens in the second encoding, wherein the object is a person's face, and wherein the attribute includes at least one or more of whether a face mask is worn, whether glasses are worn, a face direction, closed eyes, a facial expression, an age, a race, or a gender.

14. A non-transitory computer-readable storage medium storing instructions that, when executed by at least one processor, configures the at least one processor to perform a method for controlling an image processing apparatus that performs multitask learning to learn a main task of extracting a feature amount of an object and a sub task of determining an attribute of the object, the method comprising:

obtaining an image including the object;

dividing the obtained image into a plurality of partial images;

converting the plurality of partial images into tokens, the tokens being vectors having a fixed dimension;

adding a class token to a sequence of the tokens, the class token having the fixed dimension corresponding to the tokens;

updating, in encoding, the sequence of the tokens to which the class token is added based on relevance between the tokens thereby generating an updated class token from the class token;

extracting the feature amount of the object using the updated class token; and determining the attribute of the object using the updated class token, wherein the object is a person's face, and wherein the attribute include at least one or more of whether a face mask is worn, whether glasses are worn, a face direction, closed eyes, a facial expression, an age, a race or a gender.

15. A non-transitory computer-readable storage medium storing instructions that, when executed by at least one processor, configures the at least one processor to perform a method for controlling an image processing apparatus that performs multitask learning to learn a main task of extracting a feature amount of an object and a sub task of determining an attribute of the object, the method comprising:

obtaining an image including the object;

dividing the obtained image into a plurality of partial images;

converting the plurality of partial images into tokens, the tokens being vectors having a fixed dimension;

adding class tokens to a sequence of the tokens, the class tokens having the fixed dimension corresponding to the tokens;

updating, in first encoding, the sequence of the tokens to which the class tokens are added based on relevance between the tokens thereby generating first updated class tokens;

determining, in a first determination, a first attribute of the object using the first updated class tokens;

further updating, in second encoding, the sequence of the tokens and the first updated class tokens updated in the first encoding based on relevance between the tokens and the determined first attribute thereby generating second updated class tokens;

extracting the feature amount of the object using the second updated class tokens in the second encoding; and determining, in a second determination, a second attribute of the object using the second updated class tokens in the second encoding, wherein the object is a person's face, and wherein the attribute includes at least one or more of whether a face mask is worn, whether glasses are worn, a face direction, closed eyes, a facial expression, an age, a race, or a gender.

* * * * *